(12) United States Patent
Lu et al.

(10) Patent No.: US 9,001,231 B2
(45) Date of Patent: Apr. 7, 2015

(54) IMAGE ACQUISITION USING OVERSAMPLED ONE-BIT POISSON STATISTICS

(75) Inventors: Yue Lu, Arlington, MA (US); Feng Yang, Lausanne (CH); Martin Vetterli, Grandvaux (CH)

(73) Assignee: Rambus Inc., Sunnyvale, CA (US)

( * ) Notice: Subject to any disclaimer, the term of this patent is extended or adjusted under 35 U.S.C. 154(b) by 150 days.

(21) Appl. No.: 13/488,394

(22) Filed: Jun. 4, 2012

(65) Prior Publication Data

US 2012/0307121 A1    Dec. 6, 2012

Related U.S. Application Data

(60) Provisional application No. 61/492,850, filed on Jun. 3, 2011.

(51) Int. Cl.
| | | |
|---|---|---|
| H04N 9/73 | (2006.01) | |
| H04N 9/083 | (2006.01) | |
| H04N 5/335 | (2011.01) | |
| H04N 5/232 | (2006.01) | |
| G06T 1/00 | (2006.01) | |

(52) U.S. Cl.
CPC .......... H04N 5/23229 (2013.01); G06T 1/0007 (2013.01); H04N 5/335 (2013.01); H04N 5/3355 (2013.01)

(58) Field of Classification Search
CPC ... H04N 5/335; H04N 3/155; H04N 5/23229; H04N 5/3355; G06T 1/0007
USPC ......... 348/294, 302, 308, 202, 208.11, 224.1, 348/291
See application file for complete search history.

(56) References Cited

U.S. PATENT DOCUMENTS

| | | | | |
|---|---|---|---|---|
| 8,463,048 | B2 * | 6/2013 | Gilg et al. ................... | 382/213 |
| 2010/0329566 | A1 * | 12/2010 | Nikula et al. ................ | 382/190 |
| 2011/0176019 | A1 * | 7/2011 | Yang et al. .................. | 348/222.1 |
| 2013/0038766 | A1 * | 2/2013 | Perlman et al. .............. | 348/294 |
| 2013/0126703 | A1 * | 5/2013 | Caulfield ..................... | 250/206 |
| 2013/0339323 | A1 * | 12/2013 | Sulieman et al. ............ | 707/693 |

* cited by examiner

*Primary Examiner* — Nhan T Tran
*Assistant Examiner* — Chan Nguyen
(74) *Attorney, Agent, or Firm* — Charles Shemwell

(57) ABSTRACT

In an image sensor pixels in an array of binary pixels are sampled with a first oversampling factor during a first frame interval, and then sampled with a second oversampling factor during a second frame interval, the second oversampling factor exceeding the first oversampling factor.

14 Claims, 7 Drawing Sheets

IMAGE ACQUISITION USING OVERSAMPLED ONE-BIT POISSON STATISTICS

CROSS-REFERENCE TO RELATED APPLICATIONS

This application hereby claims priority to and incorporates by reference U.S. Provisional Application No. 61/492,850, filed Jun. 3, 2011 and entitled "Gigapixel Binary Sensing: Image Acquisition Using Oversampled One-Bit Poisson Statistics."

TECHNICAL FIELD

The present disclosure relates, without limitation, to computational photography, high dynamic range imaging, digital film sensors, photon-limited imaging, poisson statistics, quantization, and diffraction-limited imaging.

BACKGROUND

Before the advent of digital image sensors, photography, for the most part of its history, used film to record light information. At the heart of every photographic film are a large number of light-sensitive grains of silver-halide crystals. During exposure, each micron-sized grain has a binary fate: Either it is struck by some incident photons and becomes "exposed", or it is missed by the photon bombardment and remains "unexposed". In the subsequent film development process, exposed grains, due to their altered chemical properties, are converted to silver metal, contributing to opaque spots on the film; unexposed grains are washed away in a chemical bath, leaving behind them transparent regions on the film. Thus, in essence, photographic film is a binary imaging medium, using local densities of opaque silver grains to encode the original light intensity information. Thanks to the small size and large number of these grains, one hardly notices this quantized nature of film when viewing it at a distance, observing only a continuous gray tone.

In a binary pixel image sensor that is reminiscent of photographic film, each pixel in the sensor has a binary response, giving only a one-bit quantized measurement of the local light intensity. At the start of the exposure period, all pixels are set to 0. A pixel is then set to 1 if the number of photons reaching it during the exposure is at least equal to a given threshold q. One way to build such binary sensors is to modify standard memory chip technology, where each bit is designed to be sensitive to visible light.

With current CMOS technology, the level of integration of such systems can exceed $10^9 \sim 10^{10}$ (i.e., 1 giga to 10 giga) pixels per chip. In this case, the corresponding pixel sizes are far below the fundamental diffraction limit of light (see Section II for more details), and thus the image sensor is oversampling the optical resolution of the light. Intuitively, one can exploit this spatial redundancy to compensate for the information loss due to one-bit quantizations, as is classic in oversampled analog-to-digital conversions.

Building a gigapixel binary sensor that emulates the photographic film process was originally motivated by technical necessity. The miniaturization of camera systems calls for the continuous shrinking of pixel sizes. At a certain point, however, the limited full-well capacity (i.e., the maximum photon-electrons a pixel can hold) of small pixels becomes a bottleneck, yielding very low signal-to-noise ratios (SNRs) and poor dynamic ranges. In contrast, a binary sensor whose pixels only need to detect a few photon-electrons around a small threshold q has much less requirement for full-well capacities, allowing pixel sizes to shrink further. Numerical simulations indicate that the binary sensor can have higher dynamic ranges than conventional image sensors.

Various embodiments disclosed herein are illustrated by way of example, and not by way of limitation, in the figures of the accompanying drawings, in which like reference numerals refer to similar elements and in which.

Figure 5:
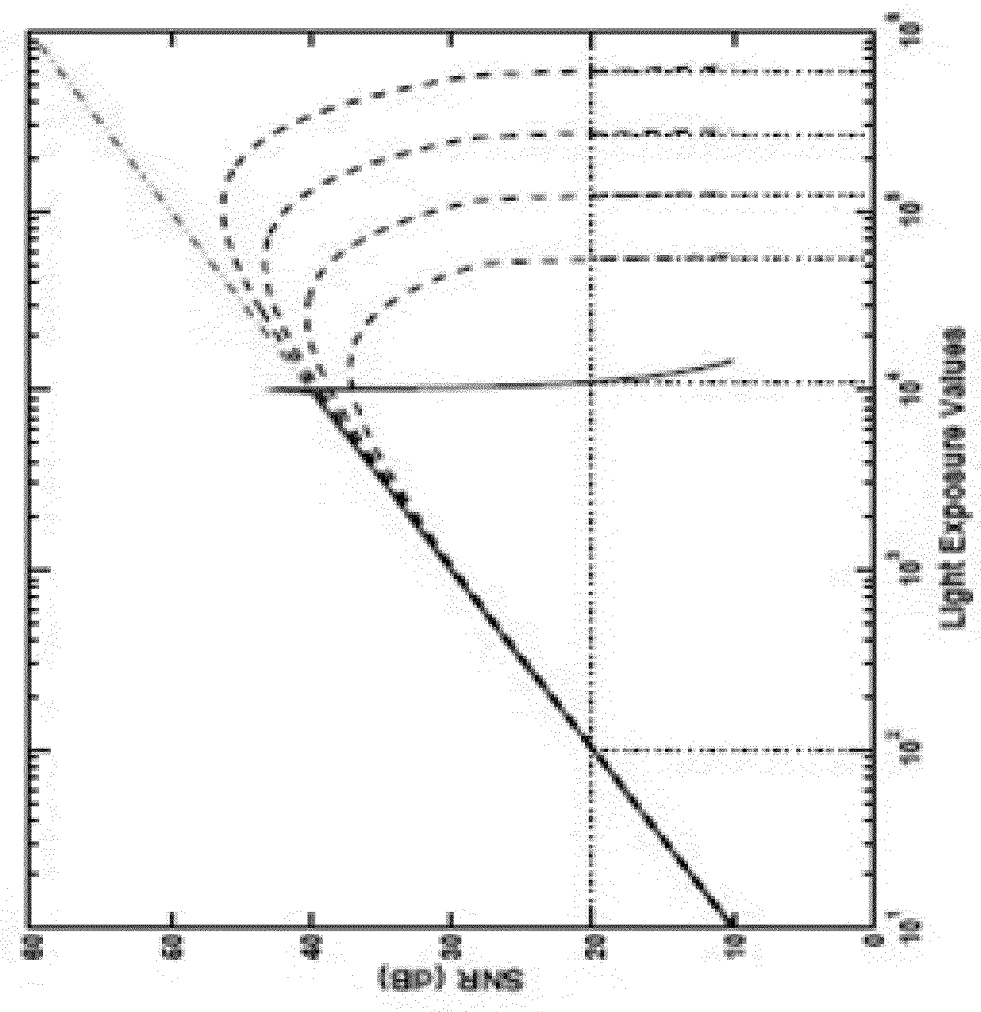
Figure 6B:
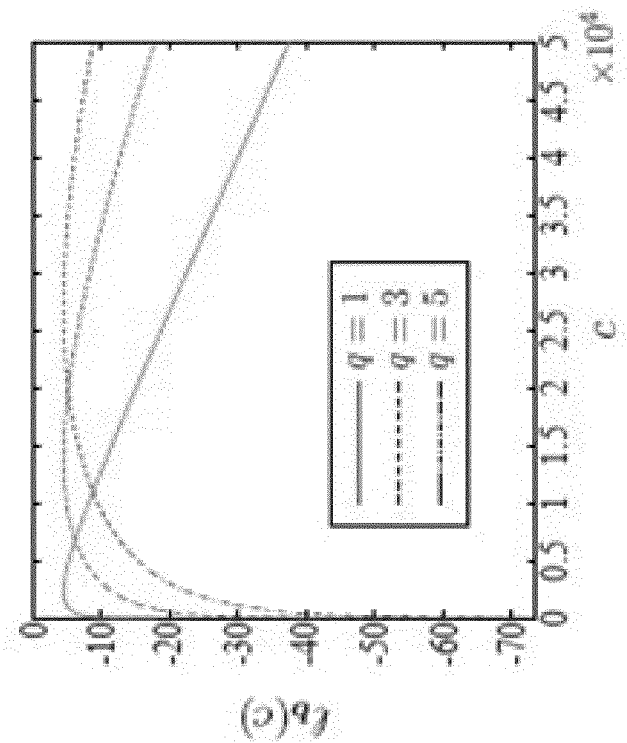
Figure 6A:
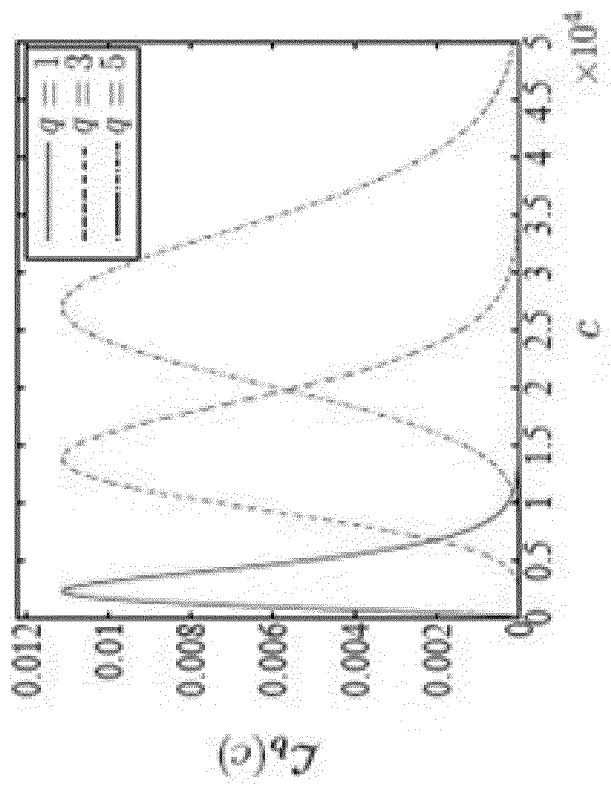
Figure 9A:
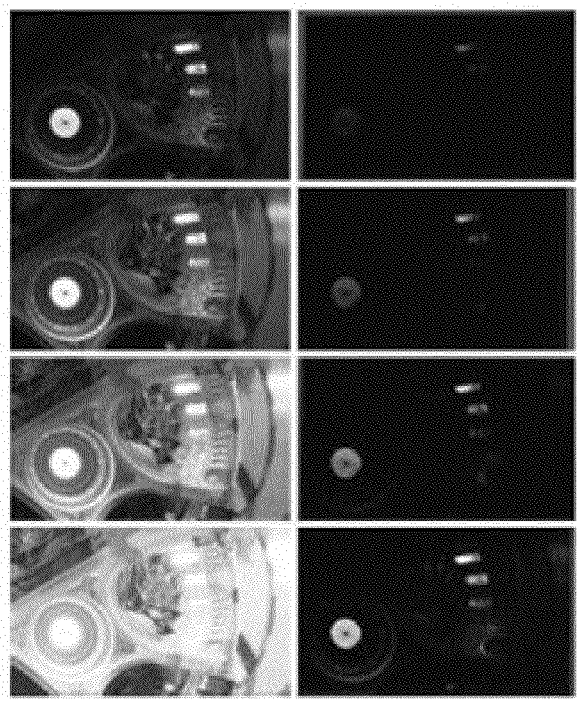
Figure 9B:
Figure 9C:
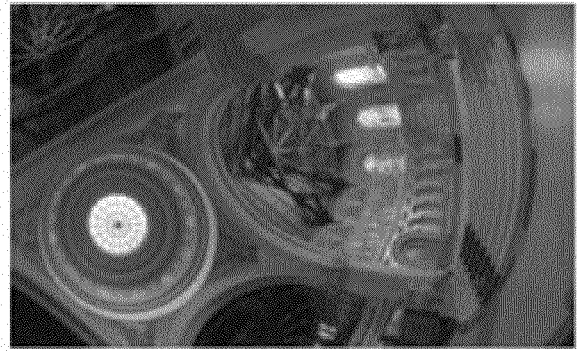
Figure 10:
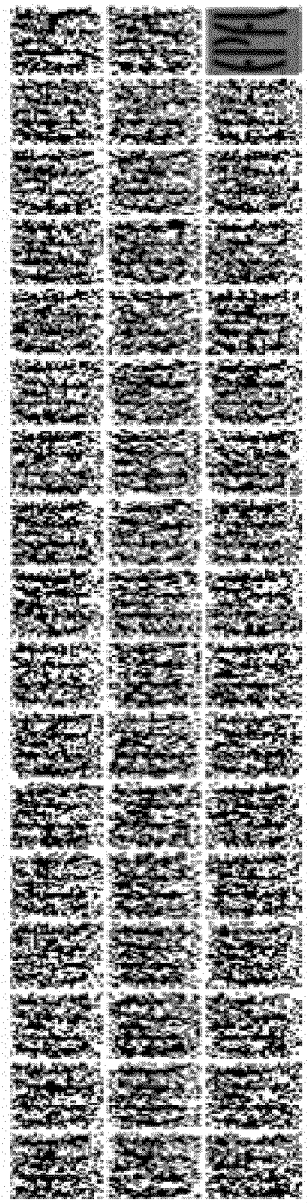

FIG. 5 compares performances of three different sensing schemes over a wide range of light exposure values;

FIGS. 6A and 6B illustrate likelihood and log-likelihood functions for piecewise-constant light fields, respectively;

FIGS. 7A-7D illustrate exemplary signal processing approaches to image reconstruction;

FIGS. 8A-8D illustrate an example of binary sensing and reconstruction of 1-D light fields;

FIGS. 9A-9C illustrate a high-dynamic range photograph using a binary sensor; and FIG. 10 illustrates reconstructing an image from binary measurements taken by a SPAD (single-photon avalanche diode) sensor.

DETAILED DESCRIPTION

A theoretical analysis of the performance of the binary image sensor is presented herein, demonstrating its advantages over traditional pixels, and efficient techniques for reconstructing images from the binary sensor measurements are disclosed in various embodiments. Since the photon arrival at each pixel can be well-approximated by a Poisson random process whose rate is determined by the local light intensity, the binary sensing and subsequent image reconstruction is formulated as a parameter estimation problem based on quantized Poisson statistics.

I. Organization

Image estimations from Poisson statistics presented herein use one-bit quantized Poisson statistics in view of the binary image sensor. The binary quantization and spatial oversampling in the sensing scheme add interesting dimensions to the problem. As discussed below in Section III, the performance of the binary sensor depends on the intricate interplay of three parameters: the average light intensity, the quantization threshold q, and the oversampling factor.

A description of a binary sensing model is presented in Section II. In Section III, the performance of the proposed binary sensor is analyzed in estimating a piecewise constant light intensity function. In what might be viewed as a surprising result, it is demonstrated that, when the quantization threshold q=1 and with large oversampling factors, the Cramér-Rao lower bound (CRLB) of the estimation variance approaches that of unquantized Poisson intensity estimation, that is, as if there were no quantization in the sensor measurements. Furthermore, the CRLB can be asymptotically achieved by a maximum likelihood estimator (MLE), for large oversampling factors. Combined, these two results establish the feasibility of trading spatial resolution for higher quantization bit-depth.

The oversampled binary sensing scheme is compared with traditional image sensors in Section III-C. Analysis shows that, with sufficiently large oversampling, the new binary sensor can have higher dynamic range, making it suitable in acquiring scenes containing both bright and dark regions.

Section IV presents an MLE-based algorithm to reconstruct the light intensity field from the binary sensor measurements. As an important result herein, it is demonstrated that the log-likelihood function in the analysis presented is always concave for arbitrary linear field models, thus ensuring the achievement of global optimal solutions by iterative algorithms. A gradient method is presented for numerically solving the MLE, and efficient implementations based on fast signal processing algorithms in the polyphase domain are derived. This attention to computational efficiency is important in practice, due to extremely large spatial resolutions of the binary sensors.

Section V presents numerical results on both synthetic data and images taken by a prototype device. These results verify the theoretical analysis on the binary sensing scheme, demonstrating the effectiveness of the image reconstruction algorithm presented herein, and showcasing the benefit of using the new binary sensor in acquiring scenes with high dynamic ranges. Section VI concludes with discussions on future research.

For notational simplicity, the discussions below are based on a one-dimensional (1-D) sensor array, which may be readily generalized to the 2-D case.

II. Imaging By Oversampled Binary Sensors

A. Diffraction Limit and Linear Light Field Models

Figure 1A:
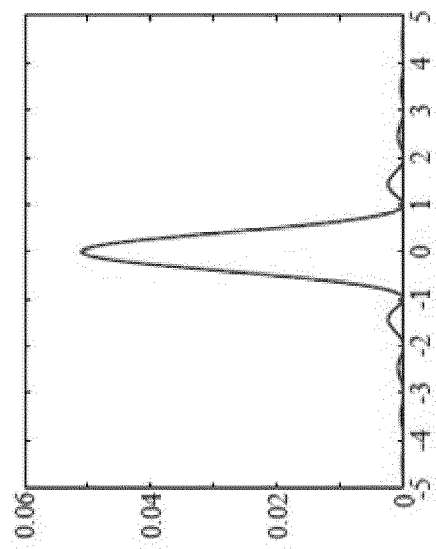
FIG. 1A illustrates an embodiment of an imaging model in the simplified architecture of a diffraction-limited imaging system.

In the simplified camera model shown in FIG. 1A, the incoming light intensity field (i.e., the radiance map) is denoted by $\lambda 0(x)$. By assuming that light intensities remain constant within a short exposure period, the field may be modeled as only a function of the spatial variable x. Without loss of generality, the dimension of the sensor may be assumed to be of one spatial unit, i.e., $0 \le x \le 1$.

After passing through the optical system, the original light field $\lambda 0(x)$ gets filtered by the lens, which acts like a linear system with a given impulse response. Due to imperfections (e.g., aberrations) in the lens, the impulse response, a.k.a. the point spread function (PSF) of the optical system, cannot be a Dirac delta, thus, imposing a limit on the resolution of the observable light field. However, a more fundamental physical limit is due to light diffraction. As a result, even if the lens is ideal, the PSF is still unavoidably a small blurry spot (see, for example, FIG. 1B). In optics, such diffraction-limited spot is often called the Airy disk, whose radius $R_a$ can be computed as $$R_a = 1.22 wf,$$

where w is the wavelength of the light and f is the F-number of the optical system.

EXAMPLE 1

At wavelength w=420 nm (i.e., for blue visible light) and f=2.8, the radius of the Airy disk is 1.45 μm. Two objects with distance smaller than $R_a$ cannot be clearly separated by the imaging system as their Airy disks on the image sensor start blurring together. Current CMOS technology can make pixels much smaller than $R_a$, reaching sizes ranging from 0.5 μm to 0.7 μm. With these image sensors, it is possible to substantially oversample the light field.

In what follows, the diffraction-limited (i.e., "observable") light intensity field, which is the outcome of passing the original light field $\lambda_0(x)$ through the lens, is denoted by $\lambda(x)$. Due to the lowpass (smoothing) nature of the PSF, the resulting $\lambda(x)$ has a finite spatial-resolution, i.e., it has a finite number of degrees of freedom per unit space.

Definition 1 (Linear Field Model): Herein, the diffraction-limited light intensity field is modeled as $$\lambda(x) = \frac{N}{\tau} \sum_{n=0}^{N-1} c_n \varphi(Nx - n), \quad (1)$$

where $\varphi(x)$ is a nonnegative interpolation kernel, N is a given integer, $\tau$ is the exposure time, and $\{c_n : c_n \ge 0\}$ is a set of free variables. Note that the constant $N/\tau$ in front of the summation is not essential, but its inclusion here leads to simpler expressions in later analysis.

Figure 1B:
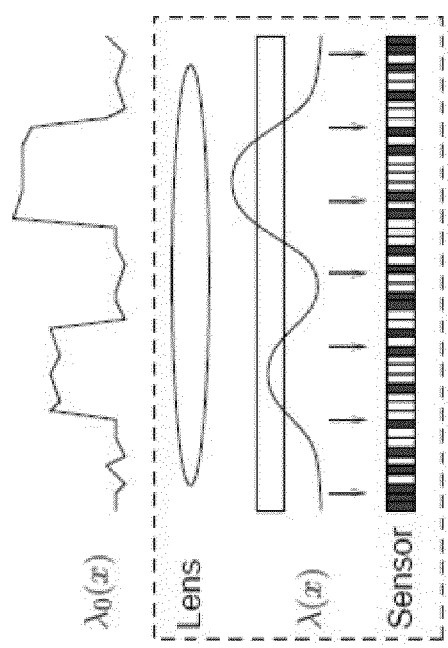
FIG. 1B illustrates a point spread function (Airy disk) of an ideal lens with a Circular aperature.

FIG. 1A illustrates an embodiment of the imaging model in the simplified architecture of a diffraction-limited imaging system. As shown, an incident light field $\lambda_0(x)$ passes through an optical lens, which acts like a linear system with a diffraction-limited point spread function (PSF). The result is a smoothed light field $\lambda(x)$, which is subsequently captured by the image sensor. FIG. 1B illustrates a PSF (Airy disk) of an ideal lens with a circular aperture.

The function $\lambda(x)$ as defined in (1) has N degrees of freedom. To guarantee that the resulting light fields are physically meaningful, both the interpolation kernel $\varphi(x)$ and the expansion coefficients $\{c_n\}$ are limited to nonnegative values. Some examples of the interpolation kernels $\varphi(x)$ include the box function, $$\beta(x) \stackrel{def}{=} \begin{cases} 1, & \text{if } 0 \le x \le 1; \\ 0, & \text{otherwise,} \end{cases} \quad (2)$$

cardinal B-splines, $$\beta_k(x) = \underbrace{(\beta * \ldots * \beta)}_{(k+1) \text{ times}}\left(x + \frac{k}{2}\right), \quad (3)$$

and the squared sin c function, $\sin^2(\pi(x-\frac{1}{2}))/(\pi(x-\frac{1}{2}))^2$.

B. Sampling the Light Intensity Function

The image sensor in FIG. 1A works as a sampling device of the light intensity function $\lambda(x)$. Suppose that the sensor consists of M pixels per unit space, and that the $m^{th}$ pixel covers the area between $[m/M, (m+1)/M]$, for $0 \le m < M$. If the total light exposure accumulated on the surface area of the $m^{th}$ pixel within an exposure time period $[0, \tau]$ is denoted by $s_m$, then, $$s_m \stackrel{def}{=} \int_0^\tau \int_{m/M}^{(m+1)/M} \lambda(x) dx dt \quad (4)$$
$$= \tau \langle \lambda(x), \beta(Mx - m) \rangle,$$

where $\beta(x)$ is the box function defined in (2) and $\langle \cdot, \cdot \rangle$ represents the standard $L^2$-inner product. Substitute the light field model (1) into the above equality, $$s_m = \left\langle \sum_n c_n N\varphi(Nx-n), \beta(Mx-m) \right\rangle \quad (5)$$

$$= \sum_n c_n \langle N\varphi(Nx-n), \beta(Mx-m) \rangle$$

$$= \sum_n c_n \left\langle \varphi(x), \beta\left(\frac{M(x+n)}{N}-m\right) \right\rangle,$$

where (5) is obtained through a change of variables $(Nx-n) \to x$.

Definition 2: The spatial oversampling factor, denoted by K, is the ratio between the number of pixels per unit space and the number of degrees of freedom needed to specify the light field $\lambda(x)$ in (1), i.e., $$K \stackrel{def}{=} \frac{M}{N}. \quad (6)$$

Herein, the "oversampled" case, where K>1, is of interest. Furthermore, K is assumed to be an integer for simplicity of notation. Using (6), and by introducing a discrete filter $$g_m \stackrel{def}{=} \langle \varphi(x), \beta(Kx-m) \rangle, m \in \mathbb{Z}, \quad (7)$$

we can simply (5) as $$s_m = \sum_n c_n g_{m-Kn}. \quad (8)$$

The above equality specifies a simple linear mapping from the expansion coefficients $\{c_n\}$ of the light field to the light exposure values $\{s_m\}$ accumulated by the image sensor. The relation in (8) can be implemented via a concatenation of upsampling and filtering, as shown in the left part of FIG. 2, which illustrates an exemplary signal processing block diagram corresponding to the imaging model presented herein. This observation can also be verified by expressing (8) in the z-transform domain $$S(z) = \sum_n c_n z^{-K_n} G(z) = C(z^K) G(z), \quad (9)$$

and using the fact that $C(z^K)$ is the z-transform of the K-fold upsampled version of $c_n$.

Figure 2:
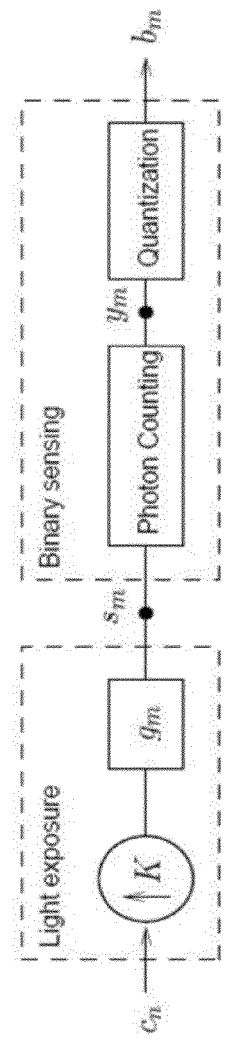
FIG. 2 illustrates an exemplary signal processing block diagram of a binary imaging sensor.

Referring again to FIG. 2, which illustrates an exemplary signal processing block diagram of the binary image sensor considered herein, in a first stage, the light exposure value $s_m$ at the $m^{th}$ pixel is related to the expansion coefficients $\tau c_n$ through a concatenation of upsampling and filtering operations. Subsequently, the image sensor converts $\{s_m\}$ into quantized measurements $\{b_m\}$. In Section IV, the signal processing block diagram in FIG. 2 is studied further to derive efficient implementations of the proposed image reconstruction algorithm.

EXAMPLE 2

The discrete filter $g_m$ is completely specified by the interpolation kernel $\phi(x)$ and the oversampling factor K. As a simple case, when the kernel $\phi(x) = \beta(x)$, it can computed from (7) that $$g_m = \begin{cases} 1/K, & \text{for } 0 \le m < K; \\ 0, & \text{otherwise.} \end{cases} \quad (10)$$

Figure 3:
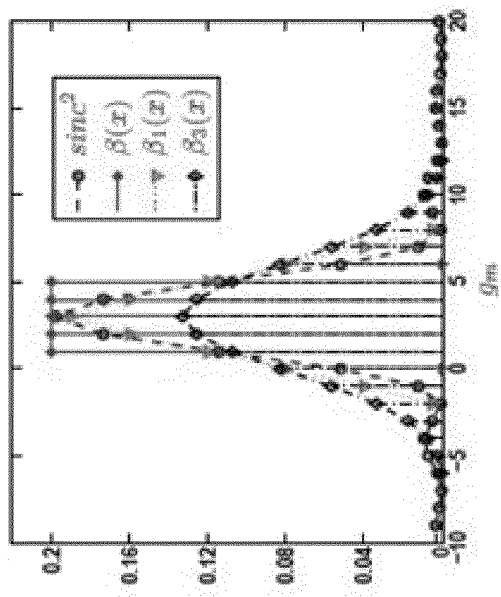
FIG. 3 illustrates an exemplary discrete filter $g_m$ generated using different kernel functions, including the sin c function, $b(x)$, $b_1(x)$, $b_3(x)$.

The discrete filter $g_m$ generated using different kernel functions (the squared sin c function, $\beta(x)$, $\beta_1(x)$, $\beta_3(x)$) is also shown in FIG. 3.

C. Binary Sensing and One-Bit Poisson Statistics

Figure 4:
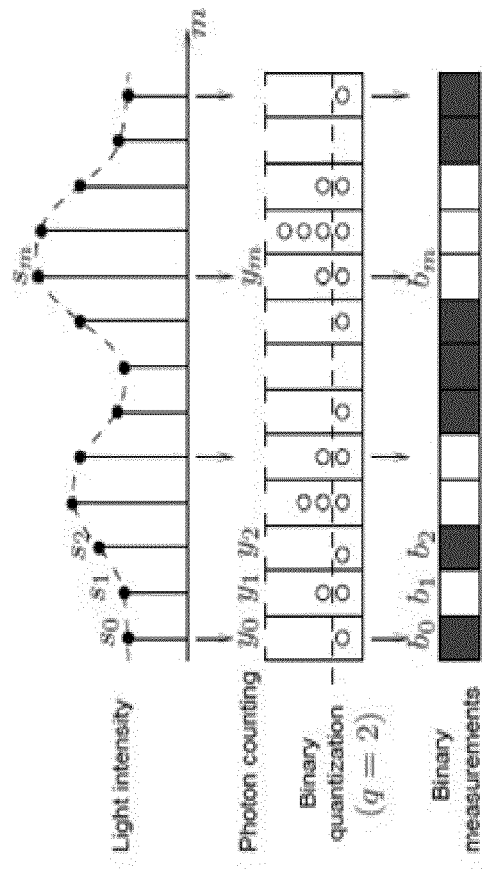
FIG. 4 illustrates an exemplary binary sensor model.

FIG. 4 illustrates an exemplary binary sensor model. Recall from (4) that $\{s_m\}$ denote the exposure values accumulated by the sensor pixels. Depending on the local values of $\{s_m\}$, each pixel (depicted as "buckets" in the figure) collects a different number of photons hitting on its surface. In what follows, the number of photons impinging on the surface of the mth pixel during an exposure period $[0, \tau]$ is denoted by $y_m$. The relation between $s_m$ and the photon count $y_m$ is stochastic. More specifically, $y_m$ can be modeled as realizations of a Poisson random variable $Y_m$, whose intensity parameter is equal to $s_m$, i.e.

$$\mathbb{P}(Y_m = y_m; s_m) = \frac{s_m^{y_m} e^{-s_m}}{y_m!}, \text{ for } y_m \in \mathbb{Z}^+ \cup \{0\}. \quad (11)$$

It is a well-known property of the Poisson process that $$\mathbb{E}[Y_m] = s_m.$$

Thus, the average number of photons captured by a given pixel is equal to the local light exposure $s_m$.

FIG. 4 illustrates an exemplary model of an embodiment of a binary image sensor. The pixels (shown as "buckets") collect photons, the numbers of which are compared against a quantization threshold q. FIG. 4 illustrates the case when q=2. The pixel outputs are binary: $b_m = 1$ (i.e., white pixels) if there are at least two photons received by the pixel; otherwise, $b_m = 0$ (i.e., gray pixels).

As a photosensitive device, each pixel in the image sensor converts photons to electrical signals, whose amplitude is proportional to the number of photons impinging on that pixel (the exact ratio between these two quantities is determined by the quantum efficiency of the sensor). In a conventional sensor design, the analog electrical signals are then quantized by an A/D converter into 8 or 12 bits (usually the more bits the better). By contrast, the sensor design herein uses the following binary (i.e., one-bit) quantization scheme.

Definition 3 (Binary Quantization): Let $q \ge 1$ be an integer threshold. A binary quantizer is a mapping $$Q: \mathbb{Z}^+ \cup \{0\} \mapsto \{0, 1\},$$

such that $$Q(y) = \begin{cases} 1, & \text{if } y \ge q; \\ 0, & \text{otherwise.} \end{cases}$$

FIG. 4 illustrates an example of the binary quantization scheme. White pixels in the figure show $Q(y_m) = 1$ and gray pixels show $Q(y_m) = 0$. The quantized output of the mth pixel is denoted by $$b_m \stackrel{def}{=} Q(y_m), b_m \in \{0, 1\}$$

Since photon counts $\{y_m\}$ are drawn from random variables $\{Y_m\}$, so are the binary sensor output $\{b_m\}$ from the random variables $$\{B_m \stackrel{def}{=} Q(Y_m)\}.$$

Introducing two functions $$p_0(s) \stackrel{def}{=} \sum_{k=0}^{q-1} \frac{s^k}{k!} e^{-s}, \; p_1(s) \stackrel{def}{=} 1 - \sum_{k=0}^{q-1} \frac{s^k}{k!} e^{-s} \qquad (12)$$

we can write $$\mathbb{P}(B_m = b_m; s_m) = p_{b_m}(s_m), \; b_m \in \{0,1\}. \qquad (13)$$

D. Multiple Exposures and Temporal Oversampling

Discussions above focus on the case of acquiring a single frame of quantized measurements during the exposure time $[0, \tau]$. Multiple exposures and acquire J consecutive and independent frames may be considered as an extension. The exposure time for each frame is set to $\tau/J$, so that the total acquisition time remains the same as the single exposure case. In what follows, J is referred to as the temporal oversampling factor.

As before, it is assumed that $\tau \ll 1$ and thus light intensities $\lambda(x)$ stay constant within $[0, \tau]$. For the $j^{th}$ frame ($0 \le j < J$), the light exposure at the $m^{th}$ pixel is denoted by $s_{j,m}$. Following the same derivations as in Section II-B, it can be shown that $$s_{j,m} = \frac{1}{J} \sum_n c_n g_{m-Kn}; \; \text{for all } j, \qquad (14)$$

where $\{c_n\}$ are the expansion coefficients of the light field $\lambda(x)$, and $g_m$ is the discrete filter defined in (7). The only difference between (14) and (8) is the extra factor of $1/J$, due to the change of exposure time from $\tau$ to $\tau/J$. In the z-domain, similar to (9), $$S_j(z) = \frac{1}{J} C(z^K) G(z). \qquad (15)$$

In what follows, an equivalence is established between temporal oversampling and spatial oversampling. More precisely, it is shown that an M-pixel sensor taking J independent exposures (i.e., with J-times oversampling in time) is mathematically equivalent to a single sensor consisting of M J pixels.

First, the following new sequence, $$\tilde{s}_m, 0 \le m < MJ.$$

is constructed by interlacing the J exposure sequences $\{s_{j,m}\}$. For example, when J=2, the new sequence is $\boxed{s_{0,0}}$, $s_{1,0}$, $\boxed{s_{0,1}}$, $s_{1,1}$,..., $\boxed{s_{0,m}}$, $s_{1,m}$,..., $\boxed{s_{0,M-1}}$, $s_{1,M-1}$, where $\{s_{0,m}\}_m$ and $\{s_{1,m}\}_m$ alternate. In general, $$\tilde{s}_m \stackrel{def}{=} s_{j,n}, m = Jn + j, 0 \le j < J, 0 \le n < M. \qquad (16)$$

In multirate signal processing, the above construction is called the polyphase representation, and its alternating subsequences the polyphase components.

Proposition 1: Let $\tilde{g}_m$ be a filter whose z-transform $$\tilde{G}(z) \stackrel{def}{=} G(z^J)(1 + z^{-1} + \ldots z^{-(J-1)})/J, \qquad (17)$$

where $G(z)$ is the z-transform of the filter $g_m$ defined in (7). Then, $$\tilde{s}_m = \sum_n c_n \tilde{g}_{m-KJn}. \qquad (18)$$

A proof of the foregoing is provided in Appendix A.

Note that proposition 1 formally establishes the equivalence between spatial and temporal oversampling. Note that (18) has exactly the same form as (8), and thus the mapping from $\{c_n\}$ to $\{\tilde{s}_m\}$ can be implemented by the same signal processing operations shown in FIG. 2, changing only the upsampling factor from K to KJ and the filter from $g_m$ to $\tilde{g}_m$. In essence, by taking J consecutive exposures with an M-pixel sensor, the same light exposure values $\{\tilde{s}_m\}$ are achieved, as if a more densely packed sensor with MJ pixels had been used. Thanks to this equivalence between spatial and temporal oversampling, the following discussions on the performance of the binary sensor and image reconstruction algorithms only need to focus on the single exposure case. All the results obtained extend directly to the multiple exposure case.

III. Performance Analysis

In this section, the performance of the binary image sensor in estimating light intensity information is considered, the influence of the quantization threshold and oversampling factors is analyzed, and the new sensor's advantage over traditional sensors in terms of higher dynamic ranges is demonstrated. The following analysis assumes that the light field is piecewise constant, i.e., the interpolation kernel $\phi(x)$ in (1) is the box function $\beta(x)$. This simplifying assumption allows derivation of closed-form expressions for several important performance measures of interest. Numerical results in Section V suggest that the results and conclusions obtained in this section apply to the general linear field model in (1) with different interpolation kernels.

A. The Cramér-Rao Lower Bound (CRLB) of Estimation Variances

From Definition 1, reconstructing the light intensity field $\lambda(x)$ boils down to estimating the unknown deterministic parameters $\{c_n\}$. Input to the estimation problem is a sequence of binary sensor measurements $\{b_m\}$, which are realizations of Bernoulli random variables $\{B_m\}$. The probability distributions of $\{B_m\}$ depend on the light exposure values $\{s_m\}$, as in (13). Finally, the exposure values $\{s_m\}$ are linked to the light intensity parameters $\{c_n\}$ in the form of (5).

The computation in example 2 demonstrates that, assuming a piecewise constant light field $\lambda(x)$, the discrete filter $g_m$ used in (5) is a constant supported within $[0, K-1]$, as in (10). The mapping (5) between $\{c_n\}$ and $\{s_m\}$ can now be simplified as $$s_m = c_n/K, \text{ for } nK \le m < (n+1)K. \qquad (19)$$

It can be seen that the parameters $\{c_n\}$ have disjoint regions of influence, meaning, c0 can only be sensed by a group of pixels $\{s_0, \ldots, s_{K-1}\}$, $c_1$ by $\{s_K, \ldots, s_{2K-1}\}$, and so on. Consequently, the parameters $\{c_n\}$ can be estimated one-by-one, independently of each other.

In what follows, and without loss of generality, $c_0$ is estimated from the block of binary measurements $$b \stackrel{def}{=} [b_0, \ldots, b_{K-1}]^T.$$

For notational simplicity, the script in $c_0$ is dropped and c used instead. To analyze the performance of the binary sensing scheme, the CRLB is first computed, providing a theoretical lower bound on the variance of any unbiased estimator.

Denoting the likelihood function of observing K binary sensor measurement b by $$\mathcal{L}_b(c)$$

then, $$\mathcal{L}_b(c) \stackrel{def}{=} \mathbb{P}(B_m = b_m, 0 \le m < K; c),$$

$$= \prod_{m=0}^{K-1} \mathbb{P}(B_m = b_m; c), \quad (20)$$

$$= \prod_{m=0}^{K-1} pb_m(c/K), \quad (21)$$

where (20) is due to the independence of the photon counting processes at different pixel locations, and (21) follows from (13) and (19). Defining $K_1$ ($0 \le K_1 < K$) to be the number of "1"s in the binary sequence b, (21) can be simplified as $$\mathcal{L}_b(c) = (p_1(c/K))^{K_1}(p_0(c/K))^{K-K_1}. \quad (22)$$

Proposition 2: The CRLB of estimating the light intensity c from K binary sensor measurements with threshold $q \ge 1$ is $$CRLB_{bin}(K, q) = c \left( \sum_{j=0}^{q-1} \frac{(q-1)!(c/K)^{-j}}{(q-1-j)!} \right) \left( \sum_{j=0}^{\infty} \frac{(q-1)!(c/K)^j}{(q+j)!} \right), \quad (23)$$

for $c > 0$.

A proof of the foregoing is provided in Appendix B.

It is interesting to compare the performance of the binary image sensor with that of an ideal sensor, which does not use quantization at all. Consider the same situation as before, where K pixels are used to observe a constant light intensity value c. The light exposure $s_m$ at each pixel is equal to c/K, as in (19). Now, unlike the binary sensor which only takes one-bit measurements, consider an ideal sensor that can record the number of photon arrivals at each pixel. Referring to FIG. 4, the sensor measurements in this case will be $\{y_m\}$, whose probability distributions are given in (11). In Appendix C, the CRLB of this unquantized sensing scheme is computed as $$CRLB_{ideal}(K) = c, \quad (24)$$

which is natural and due to the fact that the variance of a Poisson random variable is equal to its mean (i.e., c, in this case).

To be sure, $CRLB_{bin}(K, q) > CRLB_{ideal}(K)$, for arbitrary oversampling factor K and quantization threshold q. This is not surprising in view of the information lost by one-bit quantizations. In practice, the ratio between the two CRLBs provides a measure of performance degradations incurred by the binary sensors. What is surprising is that the two quantities can be made arbitrarily close, when q=1 and K is large, as shown by the following proposition.

Proposition 3: For $q = 1$, $$CRLB_{bin}(K, q) = c + \frac{c^2}{2K} + O\left(\frac{1}{K^2}\right), \quad (25)$$

which converges to $CRLB_{ideal}(K)$ as K goes to infinity. For $q \ge 2$, $$CRLB_{bin}(K,q)/CRLB_{ideal}(K) > 1.3, \quad (26)$$

and $\lim_{K \to \infty} CRLB_{bin}(K, q)/CRLB_{ideal}(K) = \infty$.

Proof: Specializing the expression (23) for q=1, we get $$CRLB_{bin}(K, 1) = c \left( 1 + \frac{c}{2K} + \frac{c^2}{3!K^2} + \frac{c^3}{4!K^3} + \ldots \right),$$

and thus (25). The statements for cases when $q \ge 2$ are shown in Appendix D.

Proposition 3 indicates that it is feasible to use oversampling to compensate for information loss due to binary quantization. It follows from (25) that, with large oversampling factors, the binary sensor operates as if there were no quantization in its measurements. It is also important to note that this desirable tradeoff between spatial resolution and estimation variance only works for a single-photon threshold (i.e., q=1). For other choices of the quantization threshold, the "gap" between $CRLB_{bin}(K, q)$ and $CRLB_{ideal}(K)$, measured in terms of their ratio, cannot be made arbitrarily small, as shown in (26). In fact, it quickly tends to infinity as the oversampling factor K increases.

The results of Proposition 3 can be intuitively understood as follows: The expected number of photons collected by each pixel during light exposure is equal to $s_m = c/K$. As the oversampling factor K goes to infinity, the mean value of the Poisson distribution tends to zero. Consequently, most pixels on the sensor will only get zero or one photon, with the probability of receiving two or more photons at a pixel close to zero. In this case, a binary quantization with threshold q=1 does not lose much information. In contrast, if $q \ge 2$, the binary sensor measurements will be almost uniformly zero, making it nearly impossible to differentiate between different light intensities.

B. Asymptotic Achievability of the CRLB

The following demonstrates that, when q=1, the CRLB derived in (23) can be asymptotically achieved by a maximum likelihood estimator (MLE). Given a sequence of K binary measurements b, the MLE to be determined is the parameter that maximizes the likelihood function shown in (22). More specifically, $$\hat{c}_{ML}(b) \stackrel{def}{=} \underset{0 \le c \le S}{\operatorname{argmax}} \mathcal{L}_b(c) \quad (27)$$

$$= \underset{0 \le c \le S}{\operatorname{argmax}} (1 - p_0(c/K))^{K_1}(p_0(c/K))^{K-K_1},$$

where $p_1(c/K)$ is substituted in (22) by its equivalent form $1 - p_0(c/K)$. The search domain $0 \le c \le S$ is chosen according to physical constraints, i.e., the light field can neither take negative values nor exceed a preset maximum value S. The upper bound S becomes necessary when $K_1=K$, in which case the likelihood function $$\mathcal{L}_b(c) = p_1(c/K)^K$$

is monotonically increasing with respect to c.

Lemma 1: The MLE solution to (27) is $$\hat{c}_{ML}(b) = \begin{cases} K\, p_0^{[-1]}(1 - K_1/K), & \text{if } 0 \le K_1 \le K(1 - p_0(S/K)), \\ S, & \text{otherwise,} \end{cases} \quad (28)$$

where $p_0^{[-1]}(x)$ is the inverse function of $p_0(x)$.

It can be verified that from the definition in (12) that $$\frac{d}{dx} p_0(x) < 0 \text{ for all } x > 0.$$

It follows that the function $p_0(x)$ is strictly decreasing for $x>0$ and that the inverse $p_0^{[-1]}(x)$ is well defined. For example, when q=1, then $p0(x)=e^{-x}$ and thus $p^{[-1]}(x)=-\log(x)$.

Proof: At the two extreme cases, when $K_1=0$ or $K_1=K$, it can be seen that (28) is indeed the solution to (27). Next, it assumed that $0<K_1<K$.

Computing the derivative of the likelihood function $$\mathcal{L}_b(c)$$

and setting it to zero, it can be verified that the equation $$\frac{d}{dc}\mathcal{L}_b(c) = 0$$

has a single solution at $$\hat{c}_{max} = K p_0^{[-1]}(1-K_1/K).$$

Since $$\mathcal{L}_b(c) \ge 0 \text{ and } \mathcal{L}_b(0) = \lim_{c \to \infty} \mathcal{L}_b(c) = 0,$$

it can be concluded that the likelihood function achieves its maximum value at $\hat{c}_{max}$. Finally, the MLE solution $\hat{c}_{ML} = \min\{\hat{c}_{max}, S\}$, and thus yielding (28).

Theorem 1: When q=1, the MLE is asymptotically unbiased, i.e., $$\mathbb{E}[\hat{c}_{ML}(b)] = c + \varepsilon_1 + O(1/K) \quad (29)$$

where $$\varepsilon_1 < (c+S)e^{1-c}\left(\frac{ec}{S-1}\right)^{S-1}.$$

Meanwhile, the mean squared error (MSE) of the estimator is $$\mathbb{E}[(\hat{c}_{ML}(b)-c)^2] = c + \varepsilon_2 + O(1/K), \quad (30)$$

where $$\varepsilon_2 < (S-2c)^2 e^{-c}\left(\frac{ec}{S-2}\right)^{S-2}.$$

Note that while the formal proof of this theorem is presented in Appendix E, its main idea can be summarized as follows. As K goes to infinity, the area of each pixel tends to zero, so does the average number of photons arriving at that pixel. As a result, most pixels on the sensor will get only zero or one photon during exposure. A single-photon binary quantization scheme can record perfectly the patterns of "0"s and "1"s on the sensor. It loses information only when a pixel receives two or more photons, but the probability of such events tends to zero as K increases.

Suppose, now, a quantization threshold q≥2. In this case, as K tends to infinity, the binary responses of different pixels will almost always be "0", essentially obfuscating the actual light intensity values. This problem leads to poor performance in the MLE. As stated in the following proposition, the asymptotic MSE for q≥2 becomes $c^2$ instead of c.

Proposition 4: When q≥2, the MLE is a asymptotically biased, with $$\lim_{K \to \infty} \mathbb{E}[\hat{c}_{ML}(b)] = 0. \quad (31)$$

Meanwhile, the MSE becomes $$\lim_{K \to \infty} \mathbb{E}[(\hat{c}_{ML}(b)-c)^2] = c^2. \quad (32)$$

A proof of the foregoing is provided in Appendix F.

C. Advantages over Traditional Sensors

The following demonstrates the advantage of the oversampled binary sensing scheme, denoted by "BIN", in achieving higher dynamic ranges. The setting is the same as before, where a K-times oversampled binary sensor is used to acquire a piecewise constant light field. Since different constant pieces of the light field can be estimated independently, the problem boils down to estimating a single light intensity parameter c using K binary pixels. In the focus here, the quantization threshold is set to q=1.

For comparisons, the following two alternative sensing schemes are also considered: The first, denoted by "IDEAL", uses a single pixel to estimate the light exposure parameter (i.e., non-oversampled), but that pixel can record perfectly the number of photon arrivals during exposure. The second scheme, denoted by "SAT", is very similar to the first, with the addition of a saturation point $C_{max}$, beyond which the pixel can hold no more photons. Note that in the discussions herein, the "SAT" scheme serves as an idealized model of conventional image sensors, for which the saturation is caused by the limited full-well capacity of the semiconductor device. The general trend of conventional image sensor design has been to pack more pixels per chip by reducing pixel sizes, leading to lower full-well capacities and thus lower saturation values.

FIG. 5 compares performances of the three different sensing schemes (i.e., "BIN", "IDEAL", and "SAT") over a wide range of light exposure values c (shown in logarithmic scale). The dash-dot line represents the IDEAL scheme with no quantization; The solid line corresponds to the SAT scheme with a saturation point set at c=104; The four dashed lines correspond to the BIN scheme with q=1 and different oversampling factors (from left to right, $K=2^{13}$, $2^{14}$, $2^{15}$ and $2^{16}$, respectively).

The performances are measured in terms of signal-to-noise ratios (SNR), defined as $$SNR = 10\log_{10}\frac{c^2}{\mathbb{E}[(\hat{c}-c)^2]}.$$

where $\hat{c}$ is the estimation of the light exposure value obtained from each of the sensing schemes.

It can be observed that the "IDEAL" scheme (the dash-dot line in FIG. 5) represents an upper-bound of the estimation performance. To see this, denote by y the number of photons that arrive at the pixel during exposure. Then y is a realization of a Poisson random variable Y with intensity equal to the light exposure value c, i.e., $$\mathbb{P}(Y=y;c) = \frac{c^y e^{-c}}{y!}.$$

Maximizing this function over c, the MLE for the "IDEAL" scheme can be computed as $\hat{c}_{IDEAL}=y$. It is easy to verify that this estimator is unbiased, i.e., $$\mathbb{E}\left[\hat{c}_{IDEAL}(Y)\right] = \mathbb{E}\left[Y\right]=c,$$

and that it achieves the ideal CRLB in (24), i.e., $$\text{var}(\hat{c}_{IDEAL}(Y))=\text{var}(Y)=c.$$

Accordingly, the SNR can be computed as $$SNR_{IDEAL}=10\log_{10}(c^2/c)=10\log_{10}(c),$$

which appears as a straight line in our figure with the light exposure values c shown in logarithmic scales.

The solid line in FIG. 5 corresponds to the "SAT" scheme, with a saturation point set at $C_{max}=10^4$. The sensor measurement in this case is $$y_{SAT} \stackrel{def}{=} \min\{y, C_{max}\},$$

and the estimator used is $$\hat{c}_{SAT}(y_{SAT})=y_{SAT}.$$

It can be seen that the "SAT" scheme initially has the same performance as "IDEAL". It remains this way until the light exposure value c approaches the saturation point $C_{max}$, after which there is a drastic drop in SNR. The reason for the short spike in SNR is that when the light exposure values are close to the saturation point, all the estimation values larger than $C_{max}$ are set to $C_{max}$, which is closer to the light exposure values than the actually estimated value, thus the estimation variance is smaller and the SNR is better than "IDEAL" scheme. Denoting by $SNR_{min}$ the minimum acceptable SNR in a given application, the dynamic range of a sensor can then be defined as the range of c for which the sensor achieves at least $SNR_{min}$. Choosing $SNR_{min}=20$ dB, for example, then, as shown in FIG. 5, the SAT scheme has a dynamic range from c=102 to c=104, or, if measured in terms of ratios, 100:1.

Finally, the four dashed lines represent the "BIN" scheme with q=1 and increasing oversampling factors (from left to right: $K=2^{13}$, $2^{14}$, $2^{15}$ and $2^{16}$, respectively). Using the MLE given in (28) and plotting the corresponding estimation SNRs, it can be seen that, within a large range of c, the performance of the "BIN" scheme is very close to that of the "IDEAL" scheme that does not use quantization. This verifies the analysis in Theorem 1, which states that the "BIN" scheme with a single-photon threshold can approach the ideal unquantized CRLB when the oversampling factor is large enough. Furthermore, when compared with the "SAT" scheme, the "BIN" scheme has a more gradual decrease in SNR when the light exposure values increase, and has a higher dynamic range. For example, when $K=2^{16}$, the dynamic range of the "BIN" scheme spans from $c=10^2$ to $c=10^{5.8}$, almost two orders of magnitudes higher than that of "SAT".

Note that exact numbers presented in FIG. 5 should be treated as mere examples: different sensors can have different saturation point S; and the acceptable SNR level $SNR_{min}$ is application-specific. However, the conclusions that may be drawn are nevertheless informative: Unlike traditional sensor designs whose dynamic ranges are constrained by the full-well capacity, binary sensors with single-photon thresholding can achieve higher dynamic ranges through oversampling. An analysis presented in Section V points to application of the binary sensor in high dynamic range photography.

IV. Optimal Image Reconstruction and Efficient Implementations

The previous section presented a study of the performance of the binary image sensor, and derived the MLE for a piecewise-constant light field model. That analysis establishes the optimality of the MLE, showing that, with single-photon quantization and large oversampling factors, the MLE approaches the performance of an ideal sensing scheme without quantization. In this section, the MLE is extended to the general linear field model in (1), with arbitrary interpolation kernels. As the analysis below demonstrates, the log-likelihood function is always concave. This desirable property guarantees the global convergence of iterative numerical algorithms in solving the MLE.

A. Image Reconstruction by MLE

Under the linear field model introduced in Definition 1, reconstructing an image [i.e., the light field $\lambda(x)$] is equivalent to estimating the parameters $\{c_n\}$ in (1). As shown in (8), the light exposure values $\{s_m\}$ at different sensors are related to $\{c_n\}$ through a linear mapping, implemented as upsampling followed by filtering as in FIG. 2. Since it is linear, the mapping (8) can be written as a matrix-vector multiplication $$s = Gc, \quad (33)$$

where $$s \stackrel{def}{=} [s_0, s_1, \ldots, s_{M-1}]^T, c \stackrel{def}{=} [c_0, c_1, \ldots, c_{N-1}]^T,$$

and G is an M×N matrix representing the combination of upsampling (by K) and filtering (by $g_m$). Each element of s can then be written as $$s_m = e_m^T Gc, \quad (34)$$

where $e_m$ is the $m^{th}$ standard Euclidean basis vector (e.g., using zero-based indexing such that $$e_0 \stackrel{def}{=} [1, 0, \ldots, 0]^T, e_1 \stackrel{def}{=} [0, 1, \ldots, 0]^T,$$

and so on).

Note that in using the above notations, no distinction is drawn between single exposure and multiple exposures, whose equivalence has been established by Proposition 1 in Section II-D above. In the case of multiple exposures, the essential structure of G—upsampling followed by filtering—remains the same. All that need be done is to replace s by the interlaced sequence $\{\tilde{s}_m\}$ constructed in (16), the oversampling factor K by KJ, and the filter $g_m$ by $\{\tilde{g}_m\}$ in (17).

Similar to our derivations in (20) and (21), the likelihood function given M binary measurements $$b \stackrel{def}{=} [b_0, b_1, \ldots, b_{M-1}]^T$$

can be computed as $$\mathcal{L}_b(c) = \prod_{m=0}^{M-1} \mathbb{P}(B_m = b_m; s_m) \qquad (35)$$
$$= \prod_{m=0}^{M-1} pb_m(e_m^T Gc),$$

where (35) follows from (12) and (34). In subsequent discussions, it is more convenient to work with the log-likelihood function, defined as $$\ell_b(c) \stackrel{def}{=} \log \mathcal{L}_b(c) = \sum_{m=0}^{M-1} \log p_{b_m}(e_m^T Gc). \qquad (36)$$

For any given observation b, the MLE of interest is the parameter that maximizes $$\mathcal{L}_b(c),$$

or equivalently, $l_b(c)$. Specifically, $$\hat{c}_{ML}(b) \stackrel{def}{=} \underset{c \in [0,S]^N}{\operatorname{argmax}} \ell_b(c) = \underset{c \in [0,S]^N}{\operatorname{argmax}} \sum_{m=0}^{M-1} \log p_{b_m}(e_m^T Gc). \qquad (37)$$

The constraint $c \in [0,S]^N$ means that every parameter $c_n$ should satisfy $0 \le c_n \le S$, for some preset maximum value S.

EXAMPLE 3

As discussed in Section III, when the light field is piecewise-constant, different light field parameters $\{c_n\}$ can be estimated independently. In that case, the likelihood function has only one variable [see (22)] and can be easily visualized. FIGS. 6A and 6B illustrate likelihood and log-likelihood functions for piecewise-constant light fields, respectively. More specifically, FIG. 6A shows the likelihood functions defined in (22) under different choices of the quantization thresholds q=1, 3, 5, respectively. FIG. 6B illustrates the corresponding log-likelihood functions. In computing these functions, the parameters in (22) are set as follows: K=8, i.e., the sensor is 8-times oversampled. The binary sensor measurements are $b=[00100001]^T$, and thus $K_1=2$.

From FIGS. 6A and 6B it may be observed that the likelihood functions are not concave, but the log-likelihood functions indeed are. The following shows that this result is general, namely, the log-likelihood functions in the form of (36) are always concave.

Lemma 2: For any two integers i, j such that $0 \le i \le j < \infty$ or $0 \le i < j = \infty$, the function $$\log \sum_{k=i}^{j} \frac{x^k e^{-x}}{k!}$$

is concave on the interval $x \in [0, \infty]$. Appendix G presents a proof of the foregoing.

Theorem 2: For arbitrary binary sensor measurements b, the log-likelihood function $l_b(c)$ defined in (36) is concave on the domain $c \in [0,C]^N$.

Proof: It follows from the definition in (12) that, for any $b_m \in \{0,1\}$, the function $\log p_{b_m}(s)$ is either $$\log \sum_{k=0}^{q-1} \frac{s^k e^{-s}}{k!} \text{ or } \log \sum_{k=q}^{\infty} \frac{s^k e^{-s}}{k!}. \qquad (38)$$

Lemma 2 can be applied in both cases to show that $\{\log p_{b_m}(s)\}$ are concave functions on $s \ge 0$. Since the sum of concave functions is still concave and the composition of a concave function with a linear mapping $$(s_m = e_m^T Gc)$$

is still concave, it may be concluded that the log-likelihood function defined in (36) is concave.

In general, there is no closed-form solution to the maximization problem in (37). An MLE solution has to be found through numerical algorithms. Theorem 2 guarantees the global convergence of these iterative numerical methods.

B. Iterative Algorithm and Efficient Implementations

The numerical solution of the MLE may be computed using a standard gradient ascent method. Denote by $c^{(k)}$ the estimation of the unknown parameter c at the $k^{th}$ step. The estimation $c^{(k+1)}$ at the next step is obtained by $$c^{(k+1)} = P_D(c^{(k)} + \gamma_k \nabla l_b(c^{(k)})), \qquad (39)$$

where $\nabla l_b(c^{(k)})$ is the gradient of the log-likelihood function evaluated at $c^{(k)}$, $\gamma_k$ is the step-size at the current iteration, and $P_D$ is the projection onto the search domain $D \stackrel{def}{=} [0,C]^N$. $P_D$ is applied to ensure that all estimations of c lie in the search domain.

Taking the derivative of the log-likelihood function $l_b(c)$ in (36), the gradient can be computed as $$\nabla \ell_b(c^{(k)}) = G^T [D_{b_0}(s_0^{(k)}), D_{b_1}(s_1^{(k)}), \ldots, D_{b_{M-1}}(s_{M-1}^{(k)})]^T, \qquad (40)$$

where $$s^{(k)} \stackrel{def}{=} [s_0^{(k)}, \ldots, s_{M-1}^{(k)}]^T = Gc^{i,k}$$

is the current estimation of the light exposure values, and $$D_b(s) \stackrel{def}{=} \frac{d}{ds} \log p_b(s) \text{ for } b = 0, 1.$$

For example, when q=1, we have $p_0(s) = e^{-s}$ and $p_1(s) = 1 - e^{-s}$. In this case, $D_0(s) = -1$ and $D_1(s) = 1/(1-e^{-s})$, respectively.

The choice of the step size $\gamma_k$ has significant influence over the speed of convergence of the above iterative algorithm. In one approach, at each step, a $\gamma_k$ is chosen so that the gradient vectors at the current and the next iterations are approximately orthogonal to each other. By assuming that the estimates $s^{(k+1)}$ and $s^{(k)}$ at consecutive iterations are close to each other, the following first-order approximation can be used $$D_b(s_m^{(k+1)}) \approx D_b(s_m^{(k)}) + H_b(s_m^{(k)})(s_m^{(k+1)} - s_m^{(k)}),$$

where $$H_b(s) \overset{def}{=} \frac{d}{ds} D_b(s) = \frac{d^2}{ds^2} \log p_b(s), \text{ for } b = 0, 1.$$

It follows that $$\nabla l_b(c^{(k+1)}) = G^T [D_{b_0}(s_0^{(k+1)}), D_{b_1}(s_1^{(k+1)}), \ldots, D_{b_{M-1}}(s_{M-1}^{(k+1)})] \quad (41)$$

$$\approx \nabla l_b(c^{(k)}) + G^T \text{diag}$$

$$\{H_{b_0}(s_0^{(k)}), H_{b_1}(s_1^{(k)}), \ldots, H_{b_{M-1}}(s_{M-1}^{(k)})\}$$

$$(s^{(k+1)} - s^{(k)}).$$

Assuming that the gradient update $c^{(k)} + \gamma_k \nabla l_b(c^{(k)})$ is inside of the constraint set D, the projection operator $P_D$ in (39) can be neglected, yielding $$s^{(k+1)} - s^{(k)} = G(c^{(k+1)} - c^{(k)}) = \gamma_k G \nabla l_b(c^{(k)}).$$

Substituting the above equality into (41), the following is obtained $$\nabla l_b(c^{(k+1)}) \approx \nabla l_b(c^{(k)}) + \gamma_k G^T \text{diag}\{H_{b_0}(s_0^{(k)}), H_{b_1}(s_1^{(k)}) \ldots, H_{b_{M-1}}(s_{M-1}^{(k)})\} G \nabla l_b(c^{(k)}).$$

Finally, by requiring that $\nabla l_b(c^{(k+1)})$ be orthogonal to $\nabla l_b(c^{(k)})$, the optimal step size is computed as $$\gamma k = \frac{\|\nabla l_b(c^{(k)})\|^2}{\left\| \text{diag}\left\{ \sqrt{-H_{b_0}(s_0^{(k)})}, \ldots, \sqrt{-H_{b_{M-1}}(s_{M-1}^{(k)})} \right\} G \nabla l_b(c^{(k)}) \right\|^2}. \quad (42)$$

Note that, by definition, $H_b(s)$ (for b=0, 1) are the second-order derivatives of concave functions (see Lemma 2), and are thus nonpositive. Consequently, the terms $\sqrt{-H_b(s)}$ in the denominator of (42) are well-defined.

Figure 7B:
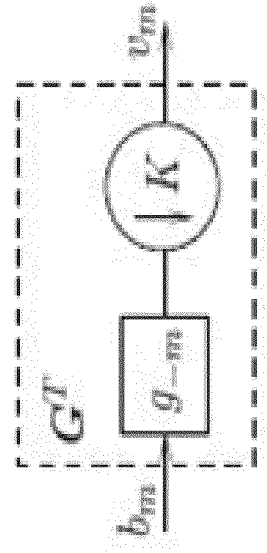

At every iteration of the gradient algorithm, the gradient and the step size $\gamma_k$ are updated. As can be seen from (40) and (42), the computations involve matrix-vector products in the form of Ga and $G^T b$, for some vectors a, b. The matrix G is of size M×N, where M is the total number of pixels. In practice, M will be in the range of $10^9 \sim 10^{10}$ (i.e., gigapixel per chip), making it difficult to directly implement the matrix operations. Fortunately, the matrix G used in both formulae are highly structured, and can be implemented as upsampling followed by filtering (see discussions in Section II-B and the expression (5) for details). Similarly, the transpose $G^T$ can be implemented by filtering (by $g_{-m}$) followed by downsampling, essentially "flipping" all the operations in G. FIGS. 7A and 7B summarize these operations.

Note that the implementations illustrated in FIGS. 7A and 7B are not yet optimized. For example, the input to the filter $g_m$ in FIG. 7A is an upsampled sequence, containing mostly zero elements; and in FIG. 7B, a full filtering operation is computed (by $g_{-m}$), only to discard most of the filtering results in the subsequent downsampling step. All these deficiencies can be eliminated by using the tool of polyphase representations from multirate signal processing as follows.

First, the filter $g_m$ is split into K non-overlapping polyphase components $g_{0,m}, g_{1,m}, \ldots, g_{K-1,m}$, defined as $$g_{k,m} = g_{Km+k}, \text{ for } 0 \le k < K \quad (43)$$

Intuitively, the polyphase components specified in (43) are downsampled versions of the original filter $g_m$, with the sampling locations of all these polyphase components forming a complete partition. The mapping between the filter $g_m$ and its polyphase components is one-to-one. To reconstruct $g_m$, it can be verified that, in the z-domain $$G(z) = G_0(z^K) + z^{-1} G_1(z^K) + \ldots z^{-(K-1)} G_{K-1}(z^K). \quad (44)$$

Figure 7D:
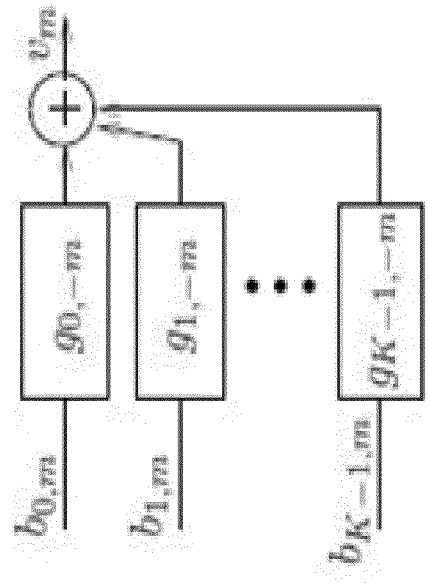
Figure 7A:
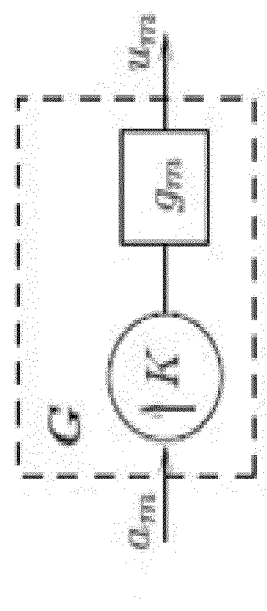
Figure 7C:
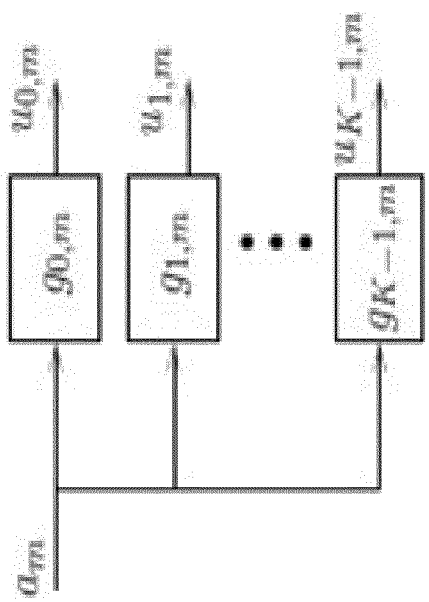

FIGS. 7A-7D illustrate exemplary signal processing implementations of Ga and $G^T b$. As shown in FIG. 7A, the product Ga can be obtained by upsampling followed by filtering. FIG. 7B demonstrates that the product, $G^T b$, can be obtained by filtered followed by downsampling. Note that the filter shown in FIG. 7(b) is $g_{-m}$, i.e., the "flipped" version of $g_m$. FIGS. 7C and 7D illustrate polyphase domain implementations corresponding to the implementations in FIGS. 7A and 7B, respectively.

Following the same steps as above, the sequences $u_m$ and $b_m$ in FIGS. 7A-7D may be split into their respective polyphase components $u_{0,m}, u_{1,m}, \ldots, u_{K-1,m}$ and $b_{0,m}, b_{1,m}, \ldots, b_{K-1,m}$.

Proposition 5: Denote by $U_k(z)$ and $B_k(z)$ (for $0 \le k < K$) the z-transforms of $u_{k,m}$ and $b_{k,m}$, respectively. Then, $$U_k(z) = A(z) G_k(z), \text{ for } 0 \le k < K, \quad (45)$$

and $$V(z) = \sum_{k=0}^{K-1} B_k(z) G_k(z^{-1}). \quad (46)$$

A proof of the foregoing is provided in Appendix H.

The results of Proposition 5 require some further explanations. What equation (45) suggests is an alternative implementation of Ga, as shown in FIG. 7C. K parallel convolutions are computed between the input $a_m$ and the polyphase filters $\{g_{k,m}\}$. The channel outputs are the polyphase components $\{u_{k,m}\}$, which can be combined to form the desired output $u_m$. Similarly, it follows from (46) that $G^T b$ can be implemented by the parallel filtering scheme shown in FIG. 7D.

The new implementations shown in FIGS. 7C and 7D are significantly faster than their respective counterparts. To see this, suppose that the filter $g_m$ has L coefficients. It can be seen that the original implementation in FIG. 7A requires $\Phi(KL)$ arithmetic operations for every pixel in $a_m$. In contrast, each individual channel in FIG. 7C requires only $\Phi(L/K)$ arithmetic operations (due to the shorter supports of the polyphase filters), and thus the total cost of FIG. 7C stays at $\Phi(L)$ operations per pixel. This represents a K-fold reduction in computational complexities. A similar analysis also shows that the implementation in FIG. 7(d) needs K-times fewer operations than that of FIG. 7B. Recall that K is the oversampling factor of the image sensor. Consequently, when operating in highly oversampled regimes (e.g., K=1024 or higher) to compensate for information loss due to one-bit quantization, the above improvements make the algorithms orders of magnitudes faster.

V. Numerical Results

Several numerical results are presented in this section to verify our theoretical analysis and the effectiveness of the proposed image reconstruction algorithm.

A. 1-D Synthetic Signals

Figure 8A:
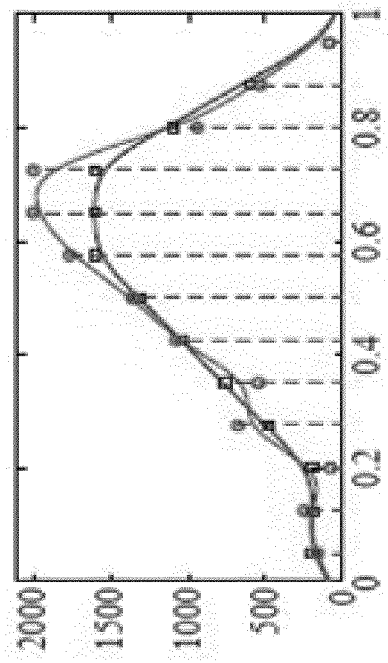
Figure 8B:
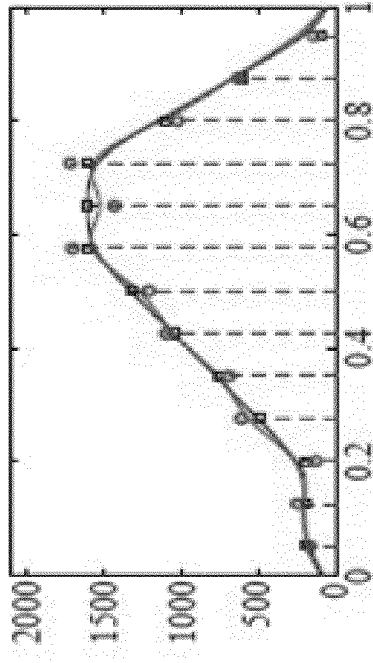
Figure 8C:
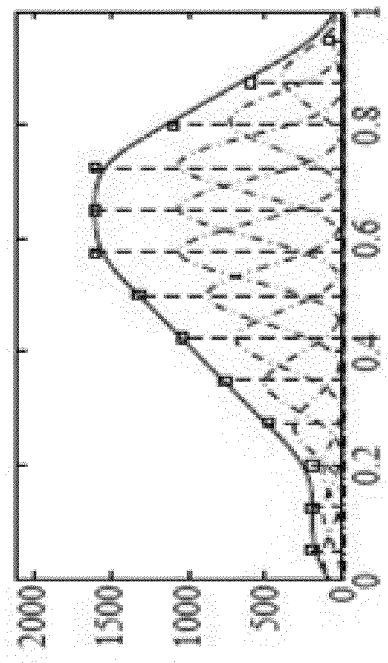
Figure 8D:
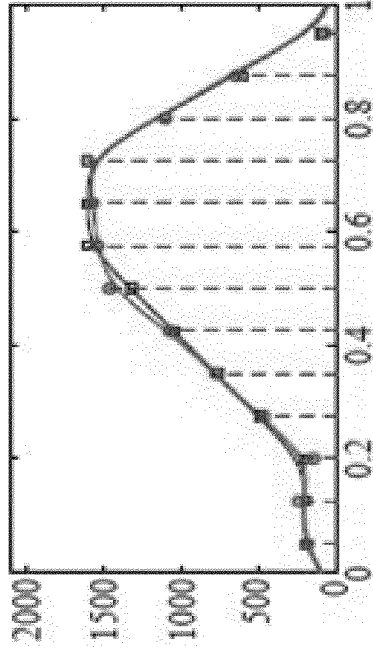

FIGS. 8A-8D illustrate an example of binary sensing and reconstruction of 1-D light fields. In FIG. 8A, the original light field, $\lambda(x)$, is modeled as a linear combination of shifted spline kernels. FIG. 8(*b*) shows the reconstruction result obtained by the proposed MLE-based algorithm, using measurements taken by a sensor with spatial oversampling factor K=256. FIG. 8C illustrates an improved reconstruction result due to the use of a larger spatial oversampling factor K=2048, and FIG. 8D illustrates an alternative result obtained by keeping K=256, but taking J=8 consecutive exposures.

Consider the 1-D light field $\lambda(x)$ as shown in FIG. 8A. The interpolation filter $\phi(x)$ employed is the cubic B-spline function $\beta_3(x)$ defined in (3). It can be seen that $\lambda(x)$ is a linear combination of the shifted kernels, with the expansion coefficients $\{c_n\}$ shown as dots in the figure.

Simulating a binary sensor with threshold q=1 and oversampling factor K=256, and applying the proposed MLE-based algorithm in Section IV, a reconstructed light field is obtained as shown by the higher-peak curve in FIG. 8B, together with the original "ground truth" (the lower-peak curve). It can be observed that the low-light regions are well-reconstructed but there exist large "overshoots" in the high-light regions.

Image reconstruction quality can be improved substantially by increasing the oversampling factor of the sensor. FIG. 8C shows the result obtained by increasing the spatial oversampling factor to K=2048. Alternatively, as shown in FIG. 8D, a different reconstruction result is obtained by keeping the original spatial oversampling factor at K=256, but taking J=8 consecutive exposures. Visually, the two sensor configurations, i.e., K=2048, J=1 and K=256, J=8, lead to very similar reconstruction performances. This observation agrees with the previous theoretical analysis in Section II-D on the equivalence between the spatial and temporal oversampling schemes.

B. Acquiring Scenes with High Dynamic Ranges

A well-known difficulty in photography is the limited dynamic ranges of the image sensors. Capturing both very bright and very dark regions faithfully in a single image is difficult. For example, FIGS. 9A-9C illustrate a high-dynamic range photograph using the binary sensor, with FIG. 9A showing a sequence of images taken inside of a church with different exposure times. The scene contains both sun-lit areas and shadow regions, with the former over a thousand times brighter than the latter. Such high dynamic ranges are well-beyond the capabilities of conventional image sensors. As a result, these images are either overexposed or underexposed, with no single image rendering details in both areas. In light of this problem, an active area of research in computational photography is to reconstruct a high dynamic range radiance map by combining multiple images with different exposure settings. While producing successful results, such approaches require complicated acquisition setups and precise registrations between consecutive images. The binary sensor discussed herein can achieve higher dynamic ranges than conventional image sensors. To demonstrate this advantage, we use a high dynamic range radiance map as the ground truth data, and simulate the acquisition of this scene by using a binary sensor with a single photon threshold. The spatial oversampling factor of the binary sensor is set to 64×64, and the temporal oversampling factor is 64 (i.e., 64 independent frames). Similar to the previous experiment on 1-D signals, a cubic B-spline kernel (i.e., $\cdot(x)=\beta 3(x)$) along each of the spatial dimensions. FIG. 9B shows the reconstructed radiance map using the MLE reconstruction algorithm described in Section N. Since the radiance map has a dynamic range of 3.3×105:1, the image is shown in logarithmic scale. To have a visually more pleasing result, a tone-mapped version of the reconstruction is shown in FIG. 9C. As can be seen in FIGS. 9B and 9C, details in both light and shadow regions have been faithfully preserved in the reconstructed radiance map, demonstrating the potential application of the binary sensor in high dynamic range photography.

C. Results on Real Sensor Data

The reconstruction algorithm has also been applied to images taken by an experimental sensor based on single photon avalanche diodes (SPADs). The sensor has binary pixels with single-photon sensitivity. Due to its experimental nature, the sensor has limited spatial resolution, containing an array of only 32×32 detectors. To emulate the effect of spatial oversampling, temporal oversampling is applied to acquire 4096 independent binary frames of a static scene. FIG. 10 shows 50 such binary images, together with the final reconstruction result (at the lower-right corner) obtained by incorporating all 4096 binary frames within the MLE algorithm presented in Section IV. The quality of reconstruction verifies the theoretical model and analysis presented above.

VI. Conclusions and Applications

An analysis of a new gigapixel image sensor that acquires light information using one-bit pixels has been presented—a scheme reminiscent of traditional photographic film. More specifically, the performance of the binary sensor in acquiring light intensity information has been analyzed by formulating the binary sensing scheme as a parameter estimation problem based on quantized Poisson statistics. The analysis shows that, with a single-photon quantization threshold and large oversampling factors, the binary sensor performs much like an ideal sensor, as if there were no quantization. To recover the light field from binary sensor measurements, an MLE-based image reconstruction algorithm has been proposed. It has been shown that the corresponding log-likelihood function is always concave, thus guaranteeing the global convergence of numerical solutions. To solve for the MLE, a standard gradient method is adopted, and efficient implementations are derived using fast signal processing algorithms in the polyphase domain. Finally, numerical results are presented on both synthetic data and images taken by a prototype sensor. These results verify the theoretical analysis and demonstrate the effectiveness of the image reconstruction algorithm. They also demonstrate the potential of the new binary sensor in high dynamic range photography applications.

The above described methods can be applied to one-dimensional image sensors, to bi-dimensional image sensors, and to three-dimensional image sensors where each pixel is able to determine a distance z to a point.

The above described methods can be used for computing a multilevel, lower resolution image (for example an image with grey levels, or a color image) from binary measurements taken from a binary sensor with high resolution. For example, this method can be used for computing a tif, jpeg or raw image from the binary measurements delivered by a gigapixel binary sensor.

The above described methods may be performed by any suitable means capable of performing the operations, such as various hardware and/or software component(s) in a still or video camera, in other image acquisition devices, or in any image processing apparatus, including computer and workstation with suitable image processing applications.

The above described methods and apparatus can be used in consumer image acquisition systems, such as still and video cameras, mobile phone with camera, webcams, etc. Those methods and apparatus are in particular useful for the acquisition of still and video images with a high dynamic range, such as but not limited to high dynamic range photography, low light acquisition (for astronomy or night images), DNA image analysis, chromatography etc.

The various equations and processing steps described in the present application may be performed by a software executed by a general purpose processor or by a digital signal processor (DSP), by an application specific integrated circuit (ASIC), by a field programmable gate array signal (FPGA), by discrete components or any combination thereof. The apparatus may be an image acquisition apparatus, such as a camera comprising a lens, an image processing apparatus in the camera or as a separate equipment (such as a separate computer), or a combination between the two, such as a camera used in combination or sequentially with a computer for acquiring and processing still or video images.

Any steps of a method according to the present application may be embodied in hardware, in a software module executed by a processor, or in a combination of the two. Thus, the invention also relates to a computer program product for performing the operations presented herein. If implemented in software, the functions described may be stored as one or more instructions on a computer-readable medium. Some examples of storage media that may be used include random access memory (RAM), read only memory (ROM), flash memory, EPROM memory, EEPROM memory, registers, a hard disk, a removable disk, other optical disks, or any available media that can be accessed by a computer, a camera or an image acquisition apparatus.

APPENDIX

A. Proof of Proposition 1

The sequence $\tilde{s}_m$ in (16) can be written, equivalently, as $$\tilde{s}_m = \sum_{j=0}^{J-1} \sum_{n=0}^{M-1} s_{j,n} \delta_{m-Jn-j},$$

where $\delta_t$ is the Kronecker delta function. Taking z-transforms on both sides of the equality leads to $$\tilde{S}(z) = \sum_{j=0}^{J-1} z^{-j} \sum_{n=0}^{M-1} s_{j,n} z^{-Jn} = \sum_{j=0}^{J-1} z^{-j} S_j(z^J). \quad (47)$$

By substituting (15) into (47) and using the definition (17), we can simplify (47) as $$\tilde{S}(z) = C(z^{KJ}) \tilde{G}(z). \quad (48)$$

Finally, since $C(z^{JK})$ is the z-transform of the sequence $\Sigma_n c_n \delta_{m-JKn}$, it follows from (48) that $$\tilde{s}_m = \left( \sum_n c_n \delta_{m-JKn} \right) * \tilde{g}_m,$$

and thus (18).

B. The CRLB of Binary Sensors

We first compute the Fisher information, defined as $$I(c) = \mathbb{E}\left[ -\frac{\partial^2}{\partial c^2} \log \mathcal{L}_b(c) \right].$$

Using the formula (22) for $\mathcal{L}_b(c)$, we get $$I(c) = \mathbb{E}\left[ -\frac{\partial^2}{\partial c^2} (K_1 \log p_1(c/K) + (K - K_1) \log p_0(c/K)) \right] \quad (49)$$

$$= \mathbb{E}\left[ \frac{K_1(p_0''(c/K) p_1(c/K) + p_0'(c/K)^2)}{K^2 p_1(c/K)^2} - \frac{(K - K_1)(p_0''(c/K) p_0(c/K) - p_0'(c/K)^2)}{K^2 p_0(c/K)^2} \right],$$

where $$p_0'(x) = \frac{d}{dx} p_0(x) \text{ and } p_0''(x) = \frac{d^2}{dx^2} p_0(x)$$

are the first and second order derivative of $p_0(x)$, respectively. In reaching (49), we have also used the fact that $$p_1(x) = 1 - p_0(x) \text{ and thus}$$

$$p_0'(x) = -\frac{d}{dx} p_1(x) \text{ and}$$

$$p_0''(x) = \frac{d^2}{dx^2} p_1(x).$$

Note that $K_1 = \Sigma_{0 \leq m < K} b_m$ is a binomial random variable, and thus its mean can be computed as $$\mathbb{E} K_1 = K p_1(c/K) = K(1 - p_0(c/K)).$$

On substituting the above expression into (49), the Fisher information can be simplified as $$I(c) = \frac{p_0''(c/K) p_1(c/K) + p_0'(c/K)^2}{K p_1(c/K)} - \quad (50)$$

$$\frac{p_0''(c/K) p_0(c/K) - p_0'(c/K)^2}{K p_0(c/K)}$$

$$= \frac{p_0'(c/K)^2}{K p_0(c/K) p_1(c/K)}.$$

Using the definition of $p_0(x)$ in (12), the derivative in the numerator of (50) can be computed as $$p_0'(x) = -e^{-x} \frac{x^{q-1}}{(q-1)!}. \quad (51)$$

Finally, since $CRLB_{bin}(K,q) = 1/I(c)$, we reach (23) by substituting (12) and (51) into (50), and after some straightforward manipulations.

C. The CRLB of Ideal Unquantized Sensors

Without quantization, the sensor measurements are $$y \stackrel{def}{=} [y_0, y_1, \ldots, y_{K-1}]^T,$$

i.e., the number of photon collected at each pixel. The likelihood function in this case is $$\mathcal{L}_y(c) \stackrel{def}{=} \mathbb{P}(Y_m = y_m, 0 \le m < K; c), \quad (52)$$

$$= \prod_{m=0}^{K-1} \frac{(c/K)^{y_m} e^{-c/K}}{y_m!},$$

where (20) follows from the independence of $\{Y_m\}$ and the expressions (11) and (19).

Computing the Fisher information $$I(c) = \mathbb{E}\left[-\frac{\partial^2}{\partial c^2} \log \mathcal{L}_y(c)\right],$$

we get $$I(c) = \mathbb{E}\left[-\frac{\partial^2}{\partial c^2} \sum_{m=0}^{K-1} (y_m \log(c/K) - c/K - \log(y_m!))\right] \quad (53)$$

$$= \mathbb{E}\left[\sum_{m=0}^{K-1} y_m\right] / c^2.$$

Since $\{y_m\}$ are drawn from Poisson distributions as in (11), we have $\mathbb{E}[y_m] = s_m = c/K$ for all m. It then follows from (53) that $I(c) = K(c/K)/c^2 = 1/c$ and that $CRLB_{ideal}(K) = 1/I(c) = c$.

D. Proof of Proposition 3

Using to (24), (50), (51), and through a change of variables $c/K \to x$, we have $$CRLB_{bin}(K, q) / CRLB_{ideal}(K) = \frac{p_0(x) p_1(x)}{x^{2q-1} e^{-2x} / (q-1)!^2}. \quad (54)$$

According to the definitions and properties of incomplete gamma function, $$p_0(x) = \frac{1}{(q-1)!} \int_x^\infty t^{q-1} e^{-t} dt, \text{ and}$$

$$p_1(x) = \frac{1}{(q-1)!} \int_0^x t^{q-1} e^{-t} dt.$$

By a change of variables $$t \to \frac{x^2}{t}, \; p_0(x) = \frac{1}{(q-1)!} \int_0^x \left(\frac{x^2}{t}\right)^q e^{-\frac{x^2}{t}} \frac{dt}{t}.$$

Consequently.

$$\frac{p_0(x) p_1(x)}{x^{2q-1} e^{-2x} / (q-1)!^2} = \quad (55)$$

$$\frac{\frac{1}{(q-1)!} \int_0^x \left(\frac{x^2}{t}\right)^q e^{-\frac{x^2}{t}} \frac{dt}{t} \frac{1}{(q-1)!} \int_0^x t^{q-1} e^{-t} dt}{x^{2q-1} e^{-2x} / (q-1)!^2} =$$

$$xe^{2x} \int_0^x t^{-q-1} e^{-\frac{x^2}{t}} dt \int_0^x t^{q-1} e^{-t} dt \ge xe^{2x} \left(\int_0^x t^{-1} e^{-\frac{x^2}{2t} - \frac{t}{2}} dt\right)^2,$$

(55) is reached using Cauchy-Schwarz inequality.
Since $$\int_0^x t^{-1} e^{-\frac{x^2}{2t} - \frac{t}{2}} dt = \int_x^\infty t^{-1} e^{-\frac{x^2}{2t} - \frac{t}{2}} dt,$$

(55) can be changed to $$xe^{2x} \left(\frac{1}{2} \int_0^\infty t^{-1} e^{-\frac{x^2}{2t} - \frac{t}{2}} dt\right)^2.$$

Through a change a variables $t \to t^2$, we have, $$xe^{2x} \left(\frac{1}{2} \int_0^\infty t^{-1} e^{-\frac{x^2}{2t} - \frac{t}{2}} dt\right)^2 = xe^{2x} \left(\int_0^\infty t^{-1} e^{-\frac{x^2}{2t^2} - \frac{t^2}{2}} dt\right)^2 \quad (56)$$

$$= \left(\sqrt{x} \int_0^\infty t^{-1} e^{-\frac{1}{2}(\frac{x}{t} - t)^2} dt\right)^2$$

$$= \left(\int_{-\infty}^\infty e^{-\frac{1}{2} u^2} / \sqrt{4 + u^2/x} \, du\right)^2,$$

(56) is obtained by implementing another change of variables $$t \to \frac{u}{2} + \sqrt{x + \frac{u^2}{4}}.$$

We can easily prove that (56) is a monotonically increasing function with respect to $x > 0$. So if $x \ge 1$, (56) is larger than $(\int_{-\infty}^\infty e^{-1/2 u^2} / \sqrt{4 + u^2} du)^2 = 1.31$.

When $0 \le x < 1$, if we only keep the first two terms in $p_0(x)$ and the first term in $p_0(x)$, $$\frac{p_0(x) p_1(x)}{x^{2q-1} e^{-2x} / (q-1)!^2} \ge \frac{(1+x) e^{-2x} x^q / q!}{x^{2q-1} e^{-2x} / (q-1)!^2} =$$

$$\frac{(q-1)!(x^{1-q} + x^{2-q})}{q} \ge \frac{2(q-1)!}{q}$$

We can prove that $$\frac{2(q-1)!}{q}$$

is a monotonically increasing function with respect to q, so when $q \ge 3$, $$\frac{2(q-1)!}{q} \geq 1.33.$$

For q=2, we keep the first two terms in $p_0(x)$ and $p_1(x)$, $$\frac{p_0(x)p_1(x)}{x^{2q-1}e^{-2x}/(q-1)!^2} \geq \frac{(1+x)e^{-2x}(x^2/2+x^3/6)}{x^3 e^{-2x}} =$$

$$x/6 + 2/3 + \frac{1}{2x} \geq 1.33.$$

Now we prove that when $x \geq 0$, $q \geq 2$.

$$\frac{p_0(x)p_1(x)}{x^{2q-1}e^{-2x}/(q-1)!^2} > 1.3.$$

Using (54), we get (26).

When $K \to \infty$, $x = c/K \to 0$. If we keep the first terms in $p_0(x)$ and $p_1(x)$, $$\frac{p_0(x)p_1(x)}{x^{2q-1}e^{-2x}/(q-1)!^2} \geq \frac{e^{-2x}x^q/q!}{x^{2q-1}e^{-2x}/(q-1)!^2} = \frac{(q-1)!x^{1-q}}{q}$$

So when $x \to 0$, $q \geq 2$, the above equation goes to $\infty$. Thus, $$\lim_{K \to \infty} CRLB_{bin}(K, q)/CRLB_{ideal}(K) = \infty.$$

E. Proof of Theorem 1

When q=1, we have $p_0(x) = e^{-x}$ and thus $p_0^{[-1]}(x) = -\log(x)$. In this case, the MLE solution in (28) can be written as $$\hat{c}_{ML}(b) = \begin{cases} -K\log(1 - K_1/K), & \text{if } 0 \leq K_1 \leq K(1 - e^{-S/K}), \\ S, & \text{otherwise.} \end{cases}$$

We note that $$-K\log(1 - K_1/K) = K_1 + \frac{K_1^2}{2K} + \frac{K_1^3}{3K^2} + \ldots$$

and that $\lim_{K \to \infty} K(1 - e^{-S/K}) = S$. Thus, for sufficiently large K, the above MLE solution can be further simplified as $$\hat{c}_{ML}(b) = \begin{cases} K_1 + O\left(\frac{1}{K}\right), & \text{if } 0 \leq K_1 < S, \\ S, & \text{otherwise.} \end{cases} \quad (57)$$

The expected value of the MLE then becomes $$\mathbb{E}[\hat{c}_{ML}(b)] = \sum_{n=0}^{S-1} n\mathbb{P}(K_1 = n) + S\sum_{n=S}^{K} \mathbb{P}(K_1 = n) + O(1/K).$$

Using the following identity $$c = \sum_{n=0}^{\infty} n \frac{c^n e^{-c}}{n!}$$

about the mean of a Poisson random variable, we have $$|\mathbb{E}[\hat{c}_{ML}(b)] - c| = \quad (58)$$

$$\left| \sum_{n=0}^{S-1} n\left(\mathbb{P}(K_1 = n) - \frac{c^n e^{-c}}{n!}\right) + S\sum_{n=S}^{K} \mathbb{P}(K_1 = n) - \sum_{n=S}^{\infty} n\frac{c^n e^{-c}}{n!} + \right.$$

$$O(1/K) \bigg| \leq \left| \sum_{n=0}^{S-1} \left(\mathbb{P}(K_1 = n) - \frac{c^n e^{-c}}{n!}\right) \right| +$$

$$S\sum_{n=S}^{K} \mathbb{P}(K_1 = n) + \sum_{n=S}^{\infty} n\frac{c^n e^{-c}}{(n-1)!} + O(1/K).$$

In what follows, we derive bounds for the quantities on the right-hand side of the above inequality. First, consider the probability $P(K_1 = n)$. Since $K_1$ is a binomial random variable, we have $$\mathbb{P}(K_1 = n) = \binom{K}{n}(1 - p_0(c/K))^n p_0(c/K)^{(K-n)} \quad (59)$$

$$= \frac{K(K-1) \ldots (K-n+1)}{n! K^n}(K(1 - e^{-c/K}))^n e^{-c(K-n)/K}.$$

For every n<S, it is easy to verify that $$\frac{K(K-1) \ldots (K-n+1)}{K^n} = 1 + O(1/K),$$

$$(K(1 - e^{-c/K}))^n = c^n + O(1/K) \text{ and}$$

$$e^{-c(K-n)/K} = e^{-c} + O(1/K).$$

Consequently, for any n<S, we can simplify (59) as $$\mathbb{P}(K_1 = n) = \frac{c^n}{n!}e^{-c} + O\left(\frac{1}{K}\right). \quad (60)$$

It follows that $$\left| \sum_{n=0}^{S-1} \left(\mathbb{P}(K_1 = n) - \frac{c^n e^{-c}}{n!}\right) \right| = O(1/K). \quad (61)$$

Next, consider the second term on the right-hand side of (58).

$$S\sum_{n=S}^{K} \mathbb{P}(K_1 = n) = S\left(1 - \sum_{n=0}^{S-1} \mathbb{P}(K_1 = n)\right)$$

$$= S\left(1 - \sum_{n=0}^{S-1} \frac{c^n}{n!}e^{-c}\right) + O(1/K) \quad (62)$$

-continued $$= S \sum_{n=S}^{\infty} \frac{c^n}{n!} e^{-c} + O(1/K)$$

$$\leq S e^{-c} \left(\frac{ec}{S}\right)^S + O(1/K), \tag{63}$$

where (62) follows from (60) and the inequality (63) is due to the Chernoff bound on the tail of Poisson distributions [17]. Similarly, the third term on the right-hand side of (58) can be rewritten as $$\sum_{n=S}^{\infty} \frac{c^n e^{-c}}{(n-1)!} = c \sum_{n=S-1}^{\infty} \frac{c^n e^{-c}}{n!} \leq c(S-1)e^{-c}\left(\frac{ec}{S-1}\right)^{S-1}, \tag{64}$$

where the inequality is again an application of the Chernoff bound. Finally, on substituting (61), (63) and (64) into (58), and after some simple manipulations, we reach (29).

The proof for the mean-squared error formula (30) is similar. Using (57), we have $$\mathbb{E}[(\hat{c}_{ML}(b) - c)^2] = \sum_{n=0}^{S-1} (n-c)^2 \mathbb{P}(K_1 = n) + \tag{65}$$
$$(S-c)^2 \sum_{n=S}^{K} \mathbb{P}(K_1 = n) + O(1/K)$$
$$= \sum_{n=0}^{S-1} (n-c)^2 \frac{c^n e^{-c}}{n!} +$$
$$(S-c)^2 \sum_{n=S}^{\infty} \frac{c^n e^{-c}}{n!} + O(1/K).$$

where in reaching (65), we have used the estimation (60) of the Binomial probabilities. We note that the variance of a Poisson random variable is equal to its mean. Thus $$c = \sum_{n=0}^{\infty} (n-c)^2 \frac{c^n e^{-c}}{n!}.$$

On combining this identity with (65), $$\left|\mathbb{E}[(\hat{c}_{ML}(b) - c)^2] - c\right| = \left|(S-c)^2 \sum_{n=S}^{\infty} \frac{c^n e^{-c}}{n!} - \sum_{n=S}^{\infty} (n-c)^2 \frac{c^n e^{-c}}{n!} + O(1/K)\right| \leq$$
$$(S^2 - 2Sc)\sum_{n=S}^{\infty} \frac{c^n e^{-c}}{n!} + \sum_{n=S}^{\infty} n^2 \frac{c^n e^{-c}}{n!} + 2c\sum_{n=S}^{\infty} n \frac{c^n e^{-c}}{n!} + O(1/K).$$

Applying the Chernoff bound to the above inequality, and after some manipulations, we get $$\left|\mathbb{E}[(\hat{c}_{ML}(b) - c)^2] - c\right| \leq (S - 2c)^2 e^{-c} \left(\frac{ec}{S-2}\right)^{S-2} + O(1/K).$$

F. Proof of Proposition 4

We have $$p_0(x) = e^{-x} \sum_{n=0}^{q-1} \frac{x^n}{n!}, \text{ and thus } 1 - p_0(x) = e^{-x} \sum_{n=q}^{\infty} \frac{x^n}{n!}.$$

It follows that $$K(1 - p_0(S/K)) = K e^{-S/K} \left(\frac{S^q}{K^q q!} + \frac{S^{q+1} e^{-x}}{K^{q+1}(q+1)!} + \ldots\right)$$
$$= e^{-S/K} \left(\frac{S^q}{K^{q-1} q!} + \frac{S^{q+1} e^{-x}}{K^q (q+1)!} + \ldots\right).$$

For $q \geq 2$ and any fixed constant S, the above quantity converges to 0 as K tends to infinity. As a result, for sufficiently large K, the MLE solution in (28) can be simplified as $$\hat{c}_{ML}(b) = \begin{cases} 0, & \text{if } K_1 = 0, \\ S, & \text{otherwise,} \end{cases} \tag{66}$$

where we have also used the fact that $p_0(0)=1$ and thus $p_0^{[-1]}(1)=0$. Using (66), we can compute the expected value of the MLE as $$\mathbb{E}[\hat{c}_{ML}(b)] = 0 \cdot \mathbb{P}(K_1=0) + S(1-\mathbb{P}(K_1=0)) = S(1-\mathbb{P}(K_1=0)). \tag{67}$$

We have $K_1=0$ when all the pixel responses are uniformly 0. The probability of seeing such an event is $$\mathbb{P}(K_1 = 0) = p_0(c/K)^K = e^{-c}\left(1 + \frac{c}{K} + \ldots + \frac{c^{q-1}}{K^{q-1}(q-1)!}\right)^K,$$

which converges to 1 as K tends to infinity, i.e., $$\lim_{K \to \infty} \mathbb{P}(K_1 = 0) = 1. \tag{68}$$

Substituting (68) into (67), we get (31).

Next, we compute the MSE as $$\mathbb{E}[(\hat{c}_{ML}(b)-c)^2] = c^2 \mathbb{P}(K_1=0) + (S-c)^2(1-\mathbb{P}(K_1=0)),$$

which, upon taking the limit as $K \to \infty$, leads to (32).

G. Proof of Lemma 2

The function $$h(x) \stackrel{def}{=} \log \sum_{k=i}^{j} \frac{x^k e^{-x}}{k!}$$

is continuously differentiable on the interval $(0, \infty)$. Therefore, to establish its concavity, we just need to show that its second derivative is nonpositive. To that end, we first introduce a sequence of functions $\{r_k(x)\}_{k \in \mathbb{Z} \cup (\infty)}$, defined as $$r_k(x) \stackrel{def}{=} \begin{cases} x^k/k!, & \text{if } 0 \leq k < \infty; \\ 0, & \text{if } k < 0 \text{ or } k = \infty. \end{cases} \tag{69}$$

It is straightforward to verify that $$\frac{d}{dx} r_k(x) = r_{k-1}(x)$$

for all $k \in Z \cap \{\infty\}$. Now, rewriting $h(x)$ as $\log \Sigma_{k=1}^{j} r_k(x) - x$ and computing its second derivative, we get $$\frac{d^2}{dx^2} h(x) = \frac{\left(\sum_{k=i}^{j} r_{k-2}\right)\left(\sum_{k=i}^{j} r_k\right) - \left(\sum_{k=i}^{j} r_{k-1}\right)^2}{\left(\sum_{k=i}^{j} r_k\right)^2}, \quad (70)$$

where we have omitted the function argument x in $r_k(x)$, $s_{r-1}(x)$ and $r_{k-2}(x)$ for notational simplicity.

Recall that our goal is to show that $$\frac{d^2}{dx^2} h(x) \le 0, \text{ for } x > 0.$$

Since the denominator of (70) is always positive, we just need to focus on its numerator. Using the identities $$\sum_{i \le k \le j} r_k = \sum_{i \le k \le j} r_{k-1} + r_j - r_i \text{ and } \sum_{i \le k \le j} r_{k-1} = \sum_{i \le k \le j} r_{k-2} + r_{j-1} - r_{i-1},$$

we can simplify the numerator of (70) as follows:

$$\left(\sum_{i \le k \le j} r_{k-2}\right)\left(\sum_{i \le k \le j} r_{k-1} + r_j - r_i\right) - \quad (71)$$

$$\left(\sum_{i \le k \le j} r_{k-1}\right)\left(\sum_{i \le k \le j} r_{k-2} + r_{j-1} - r_{i-1}\right) =$$

$$\sum_{i \le k \le j} ((r_{k-2} r_j - r_{k-1} r_{j-1}) + (r_{k-1} r_{i-1} - r_{k-2} r_i)).$$

In what follows, we show that $$r_{k-2}(x) r_j(x) - r_{k-1}(x) r_{j-1}(x) \le 0 \quad (72)$$

for arbitrary choices of $x \ge 0$ and $i \le k \le j$, where $0 < i \le j < \infty$ or $0 \le i < j = \infty$. Note that, when $k < 2$ or $j = \infty$, the left-hand side of (72) becomes $-r_{k-1}(x) r_{j-1}(x)$ and thus (72) automatically holds. Now, assume that $k \ge 2$ and $j < \infty$. From the definition in (69), the left-hand side of (72) is $$\frac{x^{k-2} x^j}{(k-2)! j!} - \frac{x^{k-1} x^{j-1}}{(k-1)!(j-1)!} = \frac{x^{k+j-2}}{(k-2)!(j-1)!}\left(\frac{1}{j} - \frac{1}{k-1}\right) \le 0$$

for $i \le k \le j$. Using similar arguments, we can also show that $$r_{k-1}(x) r_{i-1}(x) - r_{k-2}(x) r_i(x) \le 0, x \ge 0. \quad (73)$$

On substituting the inequalities (72) and (73) into (71), we verify that the numerator of (70) is nonpositive, and therefore $$\frac{d^2}{dx^2} h(x) \le 0, \text{ for all } x > 0.$$

H. Proof of Proposition 5

Expressing the signal processing operations in FIG. 7 in the z-domain, we have $$U(z) = A(z^K) G(z) \quad (74)$$

$$= A(z^K) G_0(z^K) + z^{-1} A(z^K) G_1(z^K) + \ldots +$$

$$z^{-(K-1)} A(z^K) G_{K-1}(z^K).$$

where $A(z^K)$ in the first equality is the z-transform of the K-times upsampled version of $a_m$, and (74) follows from (44). Similar to (44), we can expand $U(z)$ in terms of the z-transforms of its polyphase components, as $$U(z) = U_0(z^K) + z^{-1} U_1(z^K) + \ldots + z^{-(K-1)} U_{K-1}(z^K). \quad (75)$$

Comparing (74) against (75) and using the uniqueness of the polyphase decomposition, we conclude that $U_k(z) = A(z) G_k(z)$, for all $0 \le k < K$.

Now, consider FIG. 7(b). We note that the z-transform of $g_{-m}$ is $G(z^{-1})$. Denote by $d_m$ the output of the filtering operation. Then, its z-transform can be computed as $$D(z) = B(z) G(z^{-1}) \quad (76)$$

$$= \left(\sum_{k=0}^{K-1} z^{-k} B_k(z^K)\right)\left(\sum_{k=0}^{K-1} z^k G_k(z^{-K})\right)$$

$$= \sum_{k=0}^{K-1} B_k(z^K) G_k(z^{-K}) + \sum_{0 \le i \ne j < K} z^{j-i} B_i(z^K) G_j(z^K).$$

When downsampling $d_m$ by K, only the first term on the right-hand side of (76) will be retained; the second term is "invisible" to the sampling operation due to mismatched supports. Therefore, we have, after downsampling, $V(z) = \Sigma_{k=0}^{K-1} B_k(z) G_k(z^{-1})$.

What is claimed is:

1. An image acquisition method using an image sensor comprising an array of one-bit pixels,
    wherein the size of the pixels is below the fundamental diffraction limit of visible light, so that the image sensor is oversampling the optical resolution of visible light,
    wherein each pixel in said image sensor delivers a one-bit quantized measurement of the local light intensity received at that pixel during an acquisition period,
    wherein an image is reconstructed from the measurements of said pixels using a maximum likelihood estimation algorithm in order to retrieve coefficients ($c_n$) of a sum of interpolation kernels corresponding to said image,
    wherein the numerical solution of said maximum likelihood estimator is computed using a standard gradient ascent method.

2. An image acquisition method using an image sensor comprising an array of one-bit pixels,
    wherein the size of the pixels is below the fundamental diffraction limit of visible light, so that the image sensor is oversampling the optical resolution of visible light,
    wherein each pixel in said image sensor delivers a one-hit quantized measurement of the local light intensity received at that pixel during an acquisition period, wherein an image is reconstructed from the measurements of said pixels using a maximum likelihood estimation algorithm in order to retrieve coefficients ($c_n$) of a sum of interpolation kernels corresponding to said image, wherein the numerical solution of said maximum likelihood estimator is computed using an iterative method.

3. The image acquisition method of claim 2, wherein the numerical solution of said maximum likelihood estimator is computed by maximizing a likelihood or log-likelihood function of having a given image, given said one-bit measurements.

4. The image acquisition method of claim 2, wherein a plurality of successive exposures is taken with said image sensor, so that each pixel delivers a plurality of one bit measurements corresponding to said plurality of successive exposures, and wherein said image is reconstructed from said plurality of measurements from pixels in the array.

5. The method of claim 2, wherein a polyphase representation of the signals and/or operators is used in order to increase the computing speed.

6. The method of the claim 2, comprising using pixels with various light sensitivity thresholds on the same image sensor.

7. A computer-program product for image processing, comprising a computer readable medium comprising instruction executable to carry out the method of one of the preceding claims 2-6.

8. An image acquisition apparatus comprising:
an image sensor comprising an array of one-bit pixels, wherein the size of the pixels is below the fundamental diffraction limit of visible light, so that the image sensor is oversampling the optical resolution of visible light, wherein each pixel in said image sensor is arranged for delivering a one-bit quantized measurement of the local light intensity during an acquisition period,
an image processing circuit for reconstructing an image from said measurements using a maximum likelihood estimation algorithm in order to retrieve coefficients ($c_n$) of a sum of interpolation kernels corresponding to said image, wherein the numerical solution of said maximum likelihood estimator is computed iteratively by the image processing circuit.

9. A method of operating an image sensor having an array of binary pixels, the method comprising:
during a first frame interval, sampling pixels in the array of binary pixels with a first oversampling factor;
during a second frame interval substantially equivalent in exposure value to the first frame interval, sampling pixels in the array of binary pixels with a second oversampling factor, the second oversampling factor exceeding the first oversampling factor; and
creating a multilevel-pixel downsampled image from pixel samples gathered during the second frame interval, wherein:
the ratio of pixel samples gathered during the second frame interval multilevel pixels is substantially equal to the second oversampling factor,
multilevel-pixels in the downsampled image have a value corresponding to a maximum-likelihood estimate of the light exposure for the pixel samples corresponding to that multilevel pixel, and
the maximum likelihood estimate for a multilevel sample is $$\hat{c}_{ML}(b) = \begin{cases} Kp_0^{[-1]}(1 - K_1/K), & \text{if } 0 \le K_1 \le K(1 - p_0(S/K)), \\ S, & \text{otherwise,} \end{cases}$$

where $K_1$ is the number of pixel samples, corresponding to the multilevel sample, that detected a threshold number of photon strikes, $p_0^{(-1)}(x)$ is the inverse function of $p_0(x)$, $p_0(x)$ expresses the likelihood of $K_1$ given a light intensity c, S is a maximum result value, and K is the second oversampling factor.

10. The method of claim 9 wherein the first and second frame intervals having substantially matching durations.

11. The method of claim 9 wherein sampling pixels in the array of binary pixels with a first oversampling factor comprises reading-out values from constituent pixels of the sampling array in each of a first number of sampling intervals, and wherein sampling pixels in the array of binary pixels with a second oversampling factor comprises reading-out values from the constituent pixels of the sampling array in each of a second number of sampling intervals.

12. The method of claim 11, wherein the first number of sampling intervals is one.

13. The method of claim 11 wherein sampling pixels in the array of binary pixels with a second oversampling factor comprises, in each reading-out of a constituent pixel, creating a single-bit sample value having either a logic '1' or logic '0' state.

14. The method of claim 9 wherein the array of binary pixels comprises pixels sized below the diffraction limit of visible light.

* * * * *